(12) United States Patent
Qiu et al.

(10) Patent No.: US 10,806,000 B2
(45) Date of Patent: Oct. 13, 2020

(54) HYBRID DRIVING SCHEME FOR RGB COLOR TUNING

(71) Applicant: Lumileds Holding B.V., Schipol (NL)

(72) Inventors: Yifeng Qiu, San Jose, CA (US); John Grant, Schiphol (NL)

(73) Assignee: Lumileds Holding B.V., Schipol (NL)

( * ) Notice: Subject to any disclaimer, the term of this patent is extended or adjusted under 35 U.S.C. 154(b) by 0 days.

(21) Appl. No.: 16/543,230

(22) Filed: Aug. 16, 2019

(65) Prior Publication Data
US 2020/0245420 A1    Jul. 30, 2020

Related U.S. Application Data

(63) Continuation of application No. 16/258,193, filed on Jan. 25, 2019, now Pat. No. 10,517,156.

(51) Int. Cl.
| | |
|---|---|
| *H05B 37/02* | (2006.01) |
| *H05B 45/20* | (2020.01) |
| *H05B 45/46* | (2020.01) |
| *H05B 45/37* | (2020.01) |
| *H05B 45/395* | (2020.01) |
| *H05B 45/24* | (2020.01) |

(52) U.S. Cl.
CPC .............. *H05B 45/20* (2020.01); *H05B 45/46* (2020.01); *H05B 45/24* (2020.01); *H05B 45/37* (2020.01); *H05B 45/395* (2020.01)

(58) Field of Classification Search
CPC ................................ H05B 45/20; H05B 45/24
See application file for complete search history.

(56) References Cited

U.S. PATENT DOCUMENTS

| | | | | |
|---|---|---|---|---|
| 2010/0079088 | A1* | 4/2010 | Lipcsei | H05B 45/37 315/297 |
| 2011/0089859 | A1* | 4/2011 | Tseng | H05B 45/37 315/294 |
| 2012/0229032 | A1* | 9/2012 | Van De Ven | H05B 45/20 315/151 |
| 2013/0147370 | A1 | 6/2013 | Williams et al. | |

* cited by examiner

*Primary Examiner* — Thuy Vinh Tran
(74) *Attorney, Agent, or Firm* — Schwegman Lundberg & Woessner, P.A.

(57) ABSTRACT

A device includes an analog current division circuit configured to divide an input current into a first current and a second current, and a multiplexer array including a plurality of switches to provide the first current to a first of three colors of LEDs and the second current to a second of three colors of LEDs simultaneously during a first portion of a period, the first current to the second of three colors of LEDs and the second current to a third of three colors of LEDs simultaneously during a second portion of the period, and the first current to the first of three colors of LEDs and the second current to the third of three colors of LEDs simultaneously during a third portion of the period.

20 Claims, 23 Drawing Sheets

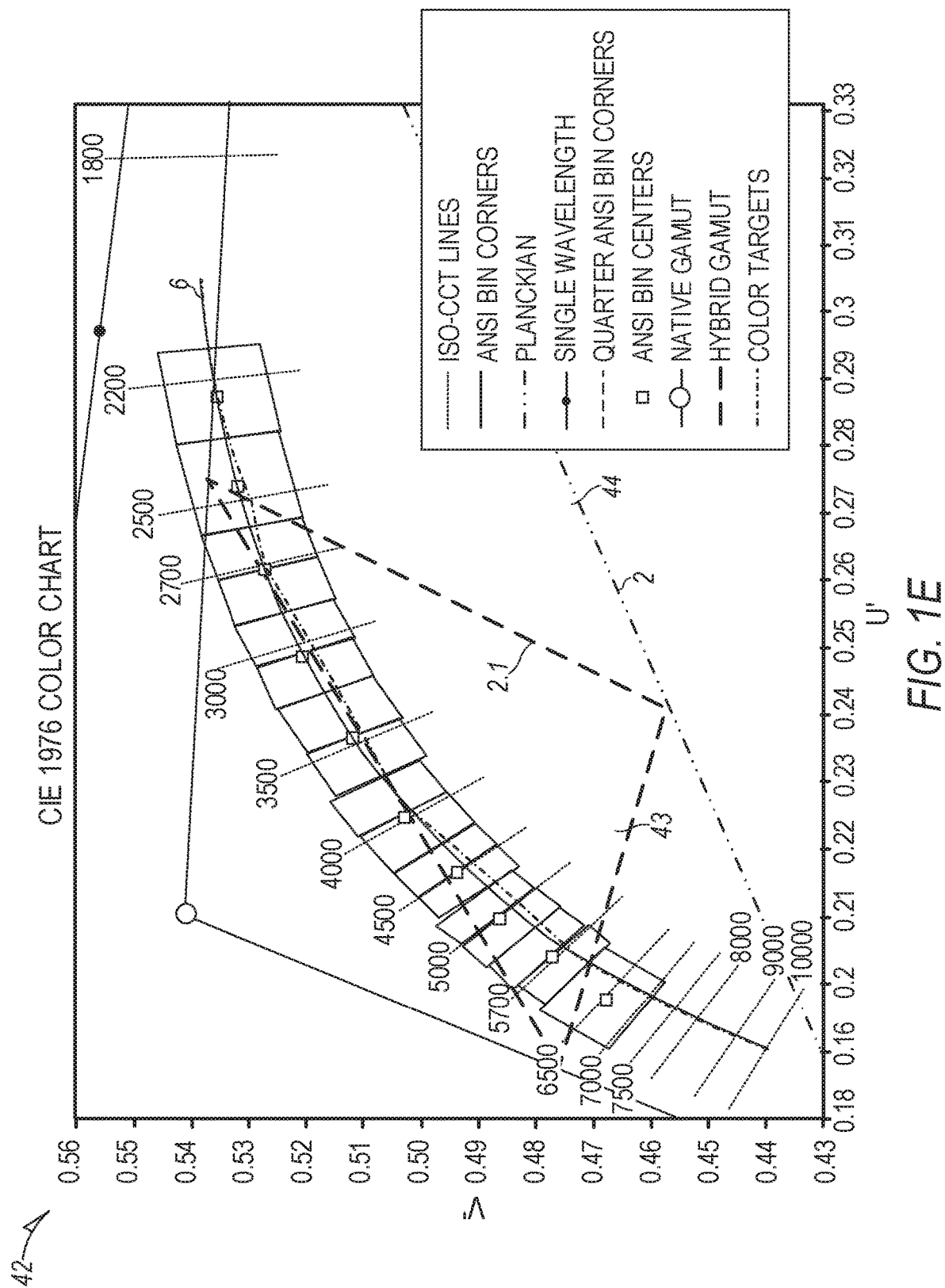

US 10,806,000 B2

HYBRID DRIVING SCHEME FOR RGB COLOR TUNING

BACKGROUND

A light-emitting diode (LED) is a semiconductor light source that emits light when current flows through it. When a suitable current is applied to the LED, electrons are able to recombine with electron holes within the LED, releasing energy in the form of photons. This effect is called electroluminescence. The color of the emitted light, which corresponds to the energy of the photon, is determined by the energy band gap of the semiconductor. White light is obtained by using multiple semiconductors or a layer of wavelength converting material on the semiconductor device.

An LED circuit, also referred to as an LED driver, is an electrical circuit used to power the LED by providing a suitable current. The circuit must provide sufficient current to light the LED at the required brightness, but must limit the current to prevent damaging the LED. The balance between sufficient current to power the LED and limiting the current to prevent damage is needed because the voltage drop across the LED is approximately constant over a wide range of operating currents. This causes a small increase in applied voltage to greatly increase the current.

A combination of LEDs is frequently used in a Red-Green-Blue (RGB) color tuning scheme. Adding in the additional LEDs and requirements of powering each LED within the RGB color tuning adds additional complexity to the driving scheme for the RGB LEDs.

SUMMARY

A device includes an analog current division circuit configured to divide an input current into a first current and a second current, and a multiplexer array including a plurality of switches to provide the first current to a first of three colors of LEDs and the second current to a second of three colors of LEDs simultaneously during a first portion of a period, the first current to the second of three colors of LEDs and the second current to a third of three colors of LEDs simultaneously during a second portion of the period, and the first current to the first of three colors of LEDs and the second current to the third of three colors of LEDs simultaneously during a third portion of the period.

BRIEF DESCRIPTION OF THE DRAWINGS

A more detailed understanding can be had from the following description, given by way of example in conjunction with the accompanying drawings wherein:

FIG. 1E illustrates a color chart for the circuit of FIG. 1C with a red LED (or array of red LEDs) located in the center position;

DETAILED DESCRIPTION

Figure 1A:
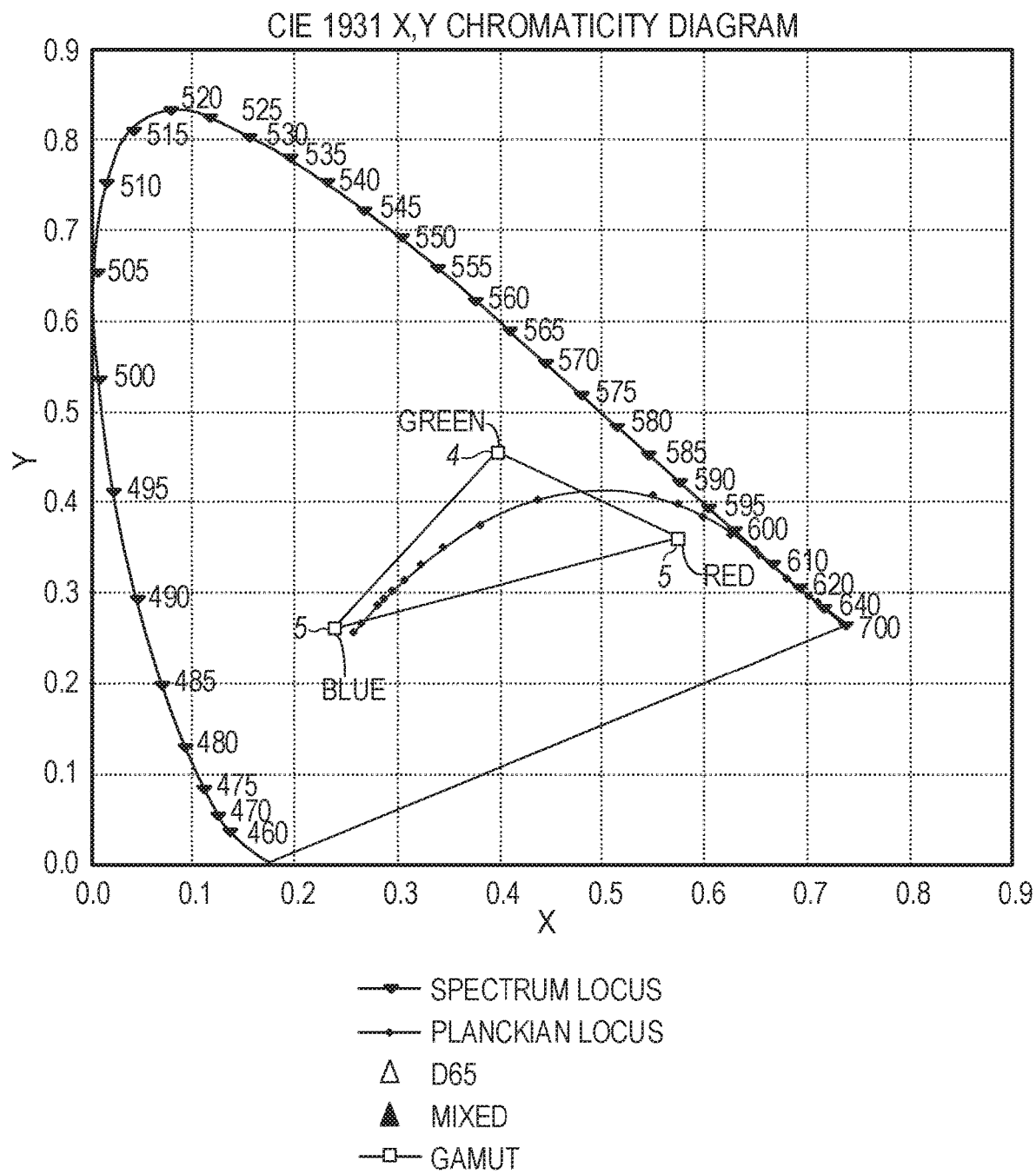
FIG. 1A illustrates a CIE chromaticity diagram representing a color space.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below." "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Further, whether the LEDs, LED arrays, electrical components and/or electronic components are housed on one, two or more electronics boards may also depend on design constraints and/or application.

Semiconductor light emitting devices (LEDs) or optical power emitting devices, such as devices that emit ultraviolet (UV) or infrared (IR) optical power, are among the most efficient light sources currently available. These devices may include light emitting diodes, resonant cavity light emitting diodes, vertical cavity laser diodes, edge emitting lasers, or the like. Due to their compact size and lower power requirements, for example, LEDs may be attractive candidates for many different applications. For example, they may be used as light sources (e.g., flash lights and camera flashes) for hand-held battery-powered devices, such as cameras and cell phones. They may also be used, for example, for automotive lighting, heads up display (HUD) lighting, horticultural lighting, street lighting, torch for video, general illumination (e.g., home, shop, office and studio lighting, theater/stage lighting and architectural lighting), augmented reality (AR) lighting, virtual reality (VR) lighting, as back lights for displays, and IR spectroscopy. A single LED may provide light that is less bright than an incandescent light source, and, therefore, multi-junction devices or arrays of LEDs (such as monolithic LED arrays, micro LED arrays, etc.) may be used for applications where more brightness is desired or required.

The present description is directed to a hybrid driving scheme for driving desaturated RGB color LEDs to make white colors with high color rendering index (CRI) and high efficiency specifically addressing color mixing using phosphor-converted color LEDs. The forward voltage of direct color LEDs decreases with increasing dominant wavelength. These LEDS are best driven with multichannel DC/DC converters. New phosphor-converted color LEDs targeting high efficacy and CRI have been created providing for new possibilities for correlated color temperature (CCT) tuning applications. The new color LEDs have desaturated (pastel) color points and can be mixed to achieve white colors with 90+ CRI over a wide CCT range. Other LEDs may have 80 CRI implementations, or even 70 CRI implementations may also be used. These possibilities require LED circuits to realize and maximize this potential. At the same time, the control circuit may be compatible with single-channel constant current drivers to facilitate market adoption.

Generally, LED drive circuits are formed using an analog approach or a pulse-width modulation (PWM) approach. In an analog driver, all colors are driven simultaneously. Each LED is driven independently by providing a different current for each LED. The analog driver results in a color shift and currently there is not a way to shift current three ways. Analog driving often results in certain color of LEDs being driven into low current mode and other times, into very high current mode. Such a wide dynamic range imposes a challenge on sensing and control hardware.

In PWM, each color is switched on in sequence at high speed. Each color is driven with the same current. The mixed color is controlled by changing the duty cycle of each color. That is one color can be driven for twice as long as another color to add into the mixed color. As human vision is unable to perceive very fast changing colors, the light appears to have one single color.

For example, the first LED is driven with a current for a certain amount of time, then the second LED is driven with the same current for a certain time, and then the third LED is driven with the current for a certain amount of time. The mixed color is controlled by changing the duty cycle of each color. For example, if you have a RGB LED and desire a specific output, red may be driven for a portion of the cycle, green for a different portion of the cycle and blue is driven for yet another portion of the cycle based on the perception of the human eye. Instead of driving the red LED at a lower current, it is driven at the same current for a shorter time. This example demonstrates the downside of PWM with the LEDs poorly utilized leading to inefficiencies.

A comparison of the two driving schemes is summarized below in Table illustrating the pros and cons of each driving technique. As is shown, analog driving provides good LED utilization, sharing of the peak current by all colors, and generally good LED efficacy and overall efficacy. PWM provides good color point predictability because all LEDs are being driven by peak current and a relatively simple and efficient controller.

TABLE 1

Pros and Cons of Analog and PWM Driving Schemes

| | Analog | PWM |
| --- | --- | --- |
| LED Utilization | + | − |
| Color Point Predictability | − some colors may only need a few mA | + all LEDs conduct peak current |
| Current Rating | + peak current is shared by all colors | − all LEDs conduct peak current |
| Controller Complexity | − complex | + simple |
| Controller Efficiency | − | + |
| LED Efficacy | + | − |
| Overall Efficacy | + | − |

The present driving scheme includes a hybrid scheme to achieve the combined benefits of analog and PWM approaches described above. The hybrid system divides the input current between two colors each time while treating the set of two colors as a virtual LED to overlay PWM time slicing. This driving scheme achieves the same level of overall efficacy as the analog drive using the same number of LEDs while preserving good color predictability. In comparison to a hybrid driving scheme, a PWM driving scheme can require 50% more LEDs to achieve the same efficacy. The benefits of the present hybrid driving scheme are added to Table 1 and presented in Table 2 below. The hybrid drive captures the analog drivers benefit in the utilization of the LEDs, current rating, LED efficacy and overall efficacy and the use of the included PWM drivers benefit in the color point predictability and the controller complexity.

TABLE 2

Pros and Cons of Analog, PWM and the Hybrid Driving Schemes

| | Analog | PWM | Hybrid |
|---|---|---|---|
| LED Utilization | + | − | + |
| Color Point Predictability | −<br>some colors may only need a few mA | +<br>all LEDs conduct peak current | + |
| Current Rating | +<br>peak current is shared by all colors | −<br>all LEDs conduct peak current | + |
| Controller Complexity | −<br>complex | +<br>simple | + |
| Controller Efficiency | − | + | − |
| LED Efficacy | + | − | + |
| Overall Efficacy | + | − | + |
| Compatible With Driver Using PWM Dimming | No | Yes | Depends on PWM Frequency |

FIG. 1A illustrates a CIE chromaticity diagram 1 representing a color space. A color space is a three-dimensional space; that is, a color is specified by a set of three numbers that specify the color and brightness of a particular homogeneous visual stimulus. The three numbers may be the International Commission on Illumination (CIE) coordinates X, Y, and Z, or other values such as hue, colorfulness, and luminance. Based on the fact that the human eye has three different types of color sensitive cones, the response of the eye is best described in terms of these three "tristimulus values."

Chromaticity diagram 1 is a color space projected into a two-dimensional space that ignores brightness. For example, the standard CIE XYZ color space corresponds to the chromaticity space specified by two chromaticity coordinates x, y. Chromaticity is an objective specification of the quality of a color regardless of its luminance. Chromaticity consists of two independent parameters, often specified as hue and colorfulness. Colorfulness may alternatively be referred to as saturation, chroma, intensity, or excitation purity. Chromaticity diagram 1 includes the colors perceivable by the human eye. Chromaticity diagram 1 uses parameters based on the spectral power distribution (SPD) of the light emitted from a colored object and are factored by sensitivity curves which have been measured for the human eye. Any color may be expressed precisely in terms of the two color coordinates x and y. The colors which can be matched by combining a given set of three primary colors, i.e., the blue, green, and red, are represented on the chromaticity diagram by a triangle 2 joining the coordinates for the three colors, i.e., red coordinate 3, green coordinate 4, and blue coordinate 5. Triangle 2 represents the color gamut.

Chromaticity diagram 1 includes the Planckian locus, or the black body line (BBL) 6. BBL 6 is the path or locus that the color of an incandescent black body would take in a particular chromaticity space as the blackbody temperature changes. It goes from deep red at low temperatures through orange, yellowish white, white, and finally bluish white at very high temperatures. Generally speaking, human eyes prefer white color points not too far away from BBL 6. Color points above BBL 6 would appear too green while those below would appear too pink.

Figure 1B:
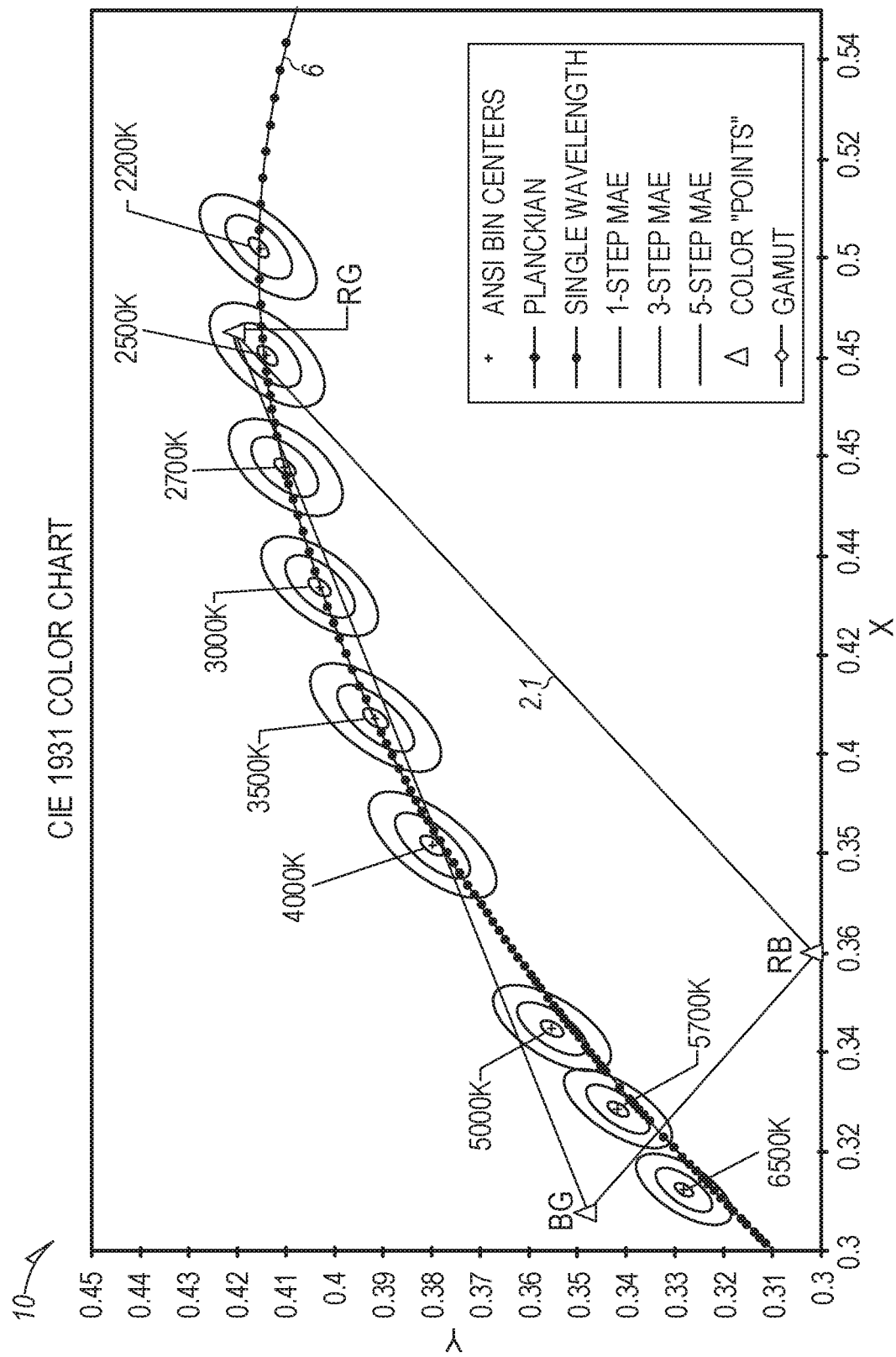
FIG. 1B illustrates a diagram illustrating different CCTs and their relationship to the BBL.

FIG. 1B illustrates a diagram 10 illustrating different CCTs and their relationship to the BBL 6. Using the three primary colors (R, G, B), and driving two colors simultaneously, three virtual color points are created (R-G, R-B, G-B) that create the gamut 2.1 of the present driving scheme. The new gamut 2.1 is smaller than the old gamut 2. Between 2700K and 4000K, the color line runs below BBL 6 within 3 STEPs. This deviation is within the human preference of viewing slightly below BBL 6 for warm CCTs. As would be understood by those possessing ordinary skills in the art, that the primary color points may be adjusted to make the gamut 2.1 fully encircle the tunable band that is of interest. By forcing the current to be divided between two colors, the efficiency and the utilization are improved.

Figure 1C:
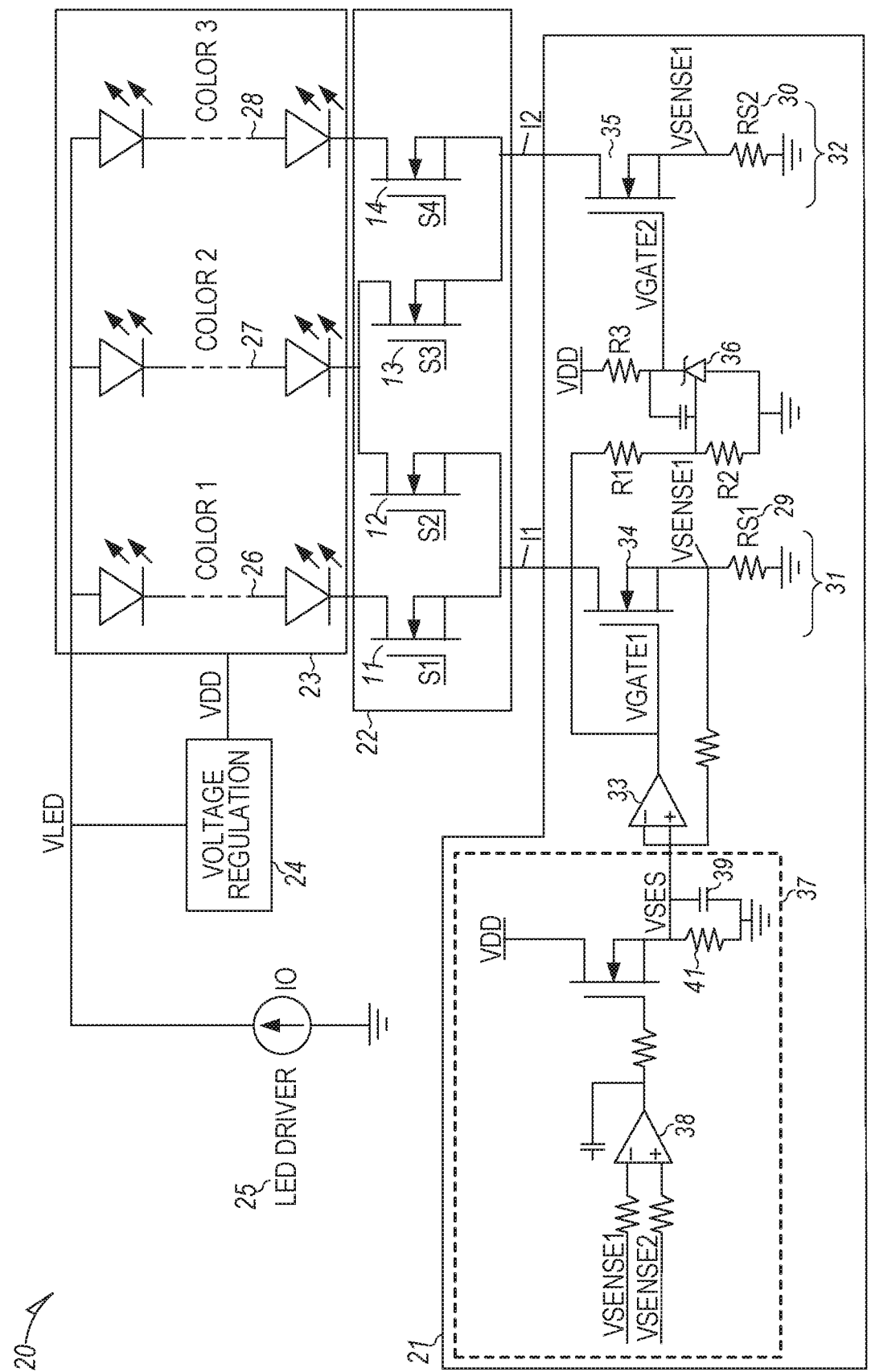
FIG. 1C illustrates an example circuit of a hybrid driving circuit for RGB tuning.

FIG. 1C illustrates an example circuit 20 of a hybrid driving circuit for RGB tuning. Circuit 20 includes a LED driver 25 electrically connected to a voltage regulator 24 that together produce a stabilized current $I_0$ and an analog current division circuit 21, a multiplexer array 22 and an LED array 23.

LED array 23 may include one or a plurality of a first color of LEDs (color 1) 26, one or a plurality of a second color of LEDs (color 2) LEDs 27, and one or a plurality of a third color of LEDs (color 3) LEDs 28 designed to be tuned using the hybrid driving circuit. In one embodiment of circuit 20, color 1 is green, color 2 is red and color 3 is blue, although any set of colors may be used for color 1, color 1 and color 3. As is understood, the assigning of colors to particular channels is simply a design choice, and while may other designs are contemplated the current description uses color 1 LED 26, color 2 LED 27 and color 3 LED 28, and also may describe embodiments where color 1 is described as green, color 2 is described as red, and color 3 is described as blue, in order to provide for a complete understanding of the hybrid driving circuit described herein.

Circuit 20 includes an analog current division circuit 21 to divide the incoming current $I_0$ into two currents $I_1$, $I_2$. Such an analog current division circuit 21 is described in U.S. patent application Ser. No. 16/145,053 entitled AN ARBITRARY-RATIO ANALOG CURRENT DIVISION CIRCUIT, which application is incorporated herein by reference as if it is set forth in its entirety. Analog current division circuit 21 may take the form of driving circuit to provide each of the two colors with equal current. Analog current division circuit 21 may account for any mismatch in forward voltage between different colors of the LEDs while allowing precise control of the drive current in each color. Alternatively, analog current division circuit 21 may allow unequal division of current, which cannot be accomplished by simply switching on both strings. As is understood, other analog current division circuits may be utilized without departing from the spirit of the present invention. Analog current division circuit 21 is provided as an exemplary divider for a complete understanding of the hybrid driving circuit described herein.

Analog current division circuit 21 may be mounted on a printed circuit board (PCB) to operate with an LED driver 25 and an LED array 23. The LED driver 25 may be a conventional LED driver known in the art. Analog current division circuit 21 may allow the LED driver 25 to be used for applications utilizing two or more LED arrays 23.

Each current channel of analog current division circuit 21 may include a sense resistor. For example, in an embodiment with two current channels, analog current division circuit 21 includes a first sense resistor (Rs1) 29 to sense a first voltage of the first current channel 31 at Vsense1 and a second sense resistor (Rs2) 30 to sense a second voltage of the second current channel 32 at Vsense2. The voltage at Vsense1 is representative of the current flowing through the first sense resistor (Rs1) 29 and the voltage at Vsense2 is representative of the current flowing through the second sense resistor (Rs2) 30.

Analog current division circuit 21 includes a computational device 37. Computational device 37 is configured to compare the first sensed voltage Vsense1 and the second sensed voltage Vsense2 to determine a set voltage Vset. If the first sensed voltage Vsense1 is lower than the second sensed voltage Vsense2, computational device 37 is configured to increase Vset. If the first sensed voltage Vsense1 device is greater than the second sensed voltage Vsense2, computational device 37 is configured to decrease the set voltage Vset.

Specifically, computational device 37 may include an operational amplifier (op amp) 38, a capacitor 39 between the location of the set voltage Vset and the ground, and a resistor 41 in parallel to the capacitor 39. The first sensed voltage Vsense1 and the second sensed voltage Vsense2 are fed to op amp 38. Computational device 37 may be configured to compare the first sensed voltage Vsense1 to the second sensed voltage Vsense2 by subtracting the first sensed voltage Vsense1 from the second sensed voltage Vsense2. When op amp 38 is in regulation, computational device 37 may be configured to convert the difference of the first sensed voltage Vsense1 and the second sensed voltage Vsense2 into a charging current to charge the capacitor 39 to increase the set voltage Vset when the first sensed voltage Vsense1 is less than the second sensed voltage Vsense2. Computational device 37 may be configured to convert the difference of the first sensed voltage Vsense1 and the second sensed voltage Vsense2 into a discharging resistor 41 to decrease the set voltage Vset when the first sensed voltage Vsense1 is greater than the second sensed voltage Vsense2.

Therefore, if the first sensed voltage Vsense1 is higher than the second sensed voltage Vsense2, computational device 37 may decrease the set voltage Vset which in turn decreases the first gate voltage Vgate1 which supplies power to the first current channel 31. Stated another way, when op amp 38 is in regulation, the first sensed voltage Vsense1 is approximately equal to second sensed voltage Vsense2. Therefore during steady state, the ratio of the current of the first current channel 31 to the current of the second current channel 32 is equal to the value of the second sense resistor Rs2 to the value of the first sense resistor Rs1, and the following equations are satisfied:

$$I\_Rs1 = V\_set/R\_s1; \quad \text{Equation 1,}$$

$$I\_Rs2 = V\_set/R\_s2, \quad \text{Equation 2.}$$

Therefore, when the value of the first sense resistor Rs1 equals the value of the second sense resistor Rs2, the current flowing through the first resistor I_Rs1 equals the current flowing through the second resistor I_Rs2 and the current division circuit 20 divides the current into two equal parts, assuming the current drawn by the auxiliary circuits, such as supply voltage generation, is negligible. It should be noted that, as will be appreciated by one having ordinary skill in the art, the computational device 37 illustrated in FIG. 1C is one of many possible implementations.

The set voltage Vset may be fed to a voltage controlled current source, which may be implemented with a first op amp 33. The first op amp 30 may provide a first gate voltage Vgate1. The first gate voltage Vgate1 may be input to a first transistor 34 that is used to provide a driving current $I_1$. The first transistor 34 may be a conventional metal oxide semiconductor field effect transistor (MOSFET). The first transistor 34 may be an n-channel MOSFET.

A second transistor 35 may provide a driving current $I_2$. The second transistor 35 may be a conventional MOSFET. The second transistor 35 may be an n-channel MOSFET. The second transistor 35 may only be switched on when the first current channel 31 is in regulation. A second gate voltage Vgate2 may flow through the second transistor 35.

The second gate voltage Vgate2 may be fed to a REF input of a shunt regulator 36. In an embodiment, shunt regulator 36 has an internal reference voltage of 2.5V. When the voltage applied at the REF node is higher than 2.5V, shunt regulator 36 may sink a large current. When the voltage applied at the REF node is lower than 2.5V, shunt regulator 36 may sink a very small quiescent current.

The large sinking current may pull the gate voltage of the second transistor 35 down to a level below its threshold, which may switch off the second transistor 35. Shunt regulator 36 may not be able to pull the cathodes more than the forward voltage (Vf) of a diode below their REF nodes. Accordingly, the second transistor 35 may have a threshold voltage that is higher than 2.5V. Alternatively, a shunt regulator with a lower internal reference voltage, such as 1.24V, may be used.

Circuit 20 includes a multiplexer array 22 that electrically connects two of the three LEDs 26, 27, 28 to the two current sources $I_1$, $I_2$ created with the analog current division circuit 21. Multiplexer array 22, as illustrated in circuit 20, may include four MOSFETs S1 (11), S2 (12), S3 (13), S4 (14), also referred to as switches. Multiplexer array 22 directs $I_1$ and $I_2$ into two of the colors of LED array 23 per time. As the table below indicates, control of MOSFET S1 11 and MOSFET S4 14 is needed as MOSFET S2 12 and MOSFET S3 13 are the inverted value of MOSFET S1 11 and MOSFET S4 14 (i.e., S2=INVERTED S1 AND S3=INVERTED S4). As defined in the following Equations, $$R_{s1}*I_1 = R_{s2}*I_2, \quad \text{Equation 3.}$$

$$I_0 = I_1 + I_2, \quad \text{Equation 4.}$$

Operationally, the hybrid driving scheme utilizes the analog current division circuit 21 to drive two colors of the LED array 23 simultaneously and then overlaying PWM time slicing with the third color of the LED array 23. The utilization of the LEDs in array 23 for the embodiment where color 1 green, color 2 red, and color 3 blue is shown in Table 3.

TABLE 3

Operational Values for Four Switches

| Color | S1 (RA0) | S2 (= INV S1) | S3 (= INV S4) | S4 (RA1) |
|---|---|---|---|---|
| R-G | ON | OFF | ON | OFF |
| G-B | ON | OFF | OFF | ON |
| R-B | OFF | ON | OFF | ON |
| R | OFF | ON | ON | OFF |

In driving the two colors simultaneously, virtual color points are created. The ratio between the currents I1 and I2 may be pre-defined (i.e., 1:1 or slightly different to maximize efficiency although any ratio may be used). Using the three colors of the LED array 23, three virtual color points can be created (R-G, R-B, G-B) plus a primary color R|G/B (fourth color point for mixing). The triangle formed by the three virtual color points (R-G, R-B, G-B) defines the gamut of the new driving scheme.

Table 4 summarizes the timing sequence of the operation of the hybrid driving scheme for 3-channel LED driving. As would be understood by those possessing an ordinary skill in the pertinent arts, the specific sequence of colors is not necessarily important. In implementations of the hybrid driving scheme, the color duplets may be arranged or rearranged in a way to minimize the complexity of the PWM logic implementation. In order to provide a sample timing sequence, Table 4 is shown below. During sub-interval T1, the color duplet of Red-Green may be powered. During sub-interval T2, the color duplet of Green-Blue may be powered. During the sub-interval T3, the color duplet of Red-Blue may be powered. The sum of sub-intervals T1, T2 and T3 combine to substantially cover the switching period T.

TABLE 4

Timing Sequence

| Color 1 | Red | Green | Red |
|---|---|---|---|
| Color 2 | Green | Blue | Blue |
| Sub-interval | T1 | T2 | T3 |
| Switching Period | | T | |

Figure 1D:
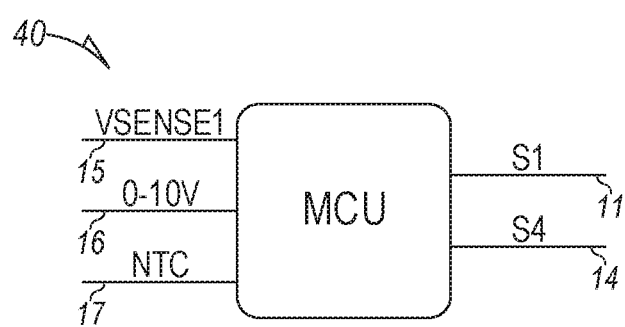
FIG. 1D illustrates a microcontroller for computational device to handle complex signal processing with less PCB resources than analog circuits.

FIG. 1D illustrates a microcontroller 40 that may be utilized for computational device 37 to handle complex signal processing with less PCB resources than analog circuit described above. Microcontroller 40 handles input signal and the operation of S1 and S4. Microcontroller 40 may monitor the absolute value of the input current by sensing VSENSE1 at input 15 and the board temperature with an NTC 17. These two readings VSENSE1 at input 15, NTC 17 can be used to compensate for color shift due to drive current and temperature. The 0-10V represents a control input 16. Microcontroller 40 may be mapped to a COT tuning curve. Microcontroller 40 translates incoming instructions to the operation of the multiplexer array 23. Specifically, microcontroller 40 may provide a first output signal 11 to control switch S1 and a second output signal 14 to control switch S4.

Figure 1F:
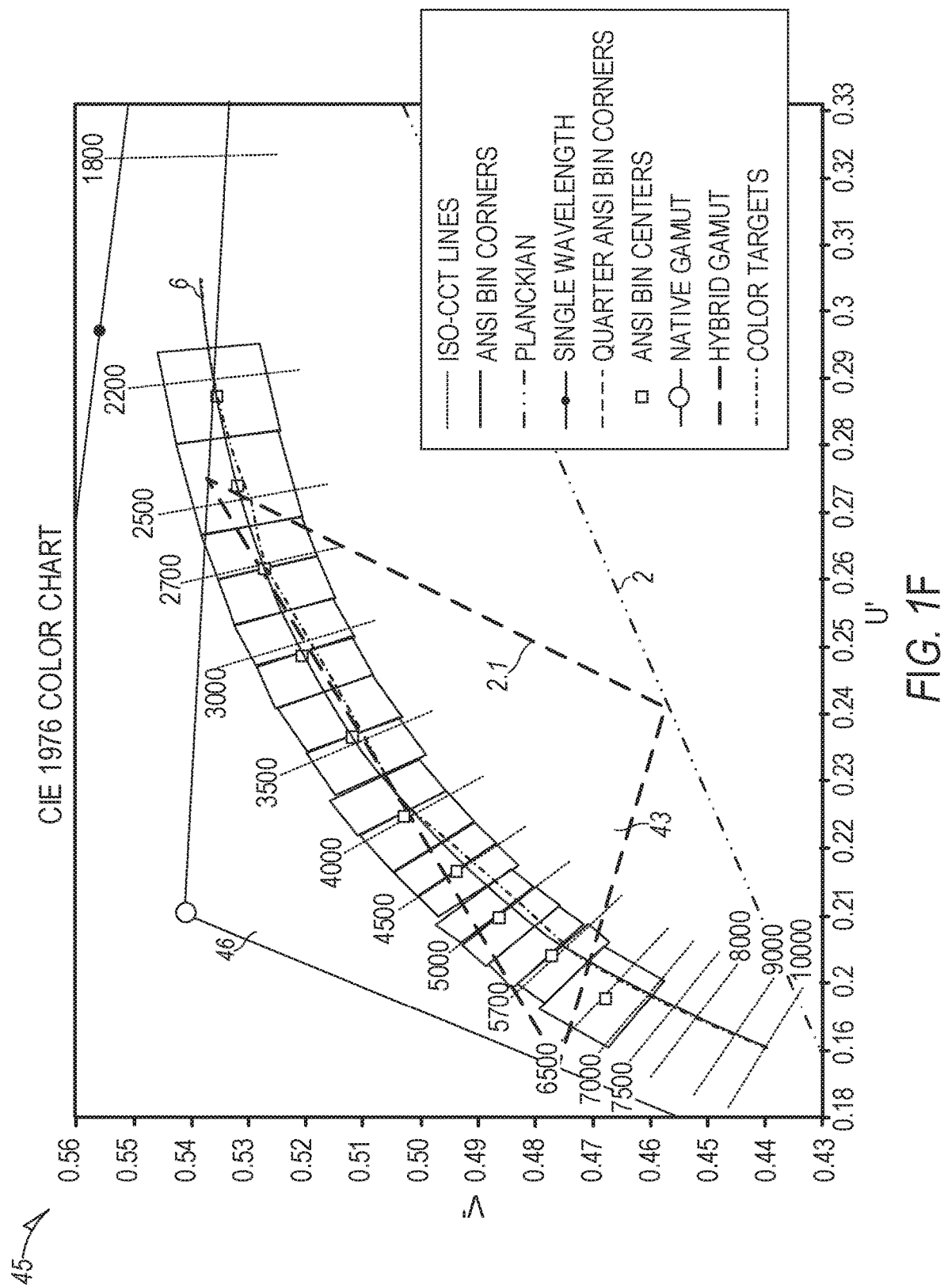
FIG. 1F illustrates a color chart for the circuit of FIG. 1C with a green LED (or array of green LEDs) located in the center position.

FIG. 1E illustrates a color chart 42 for the circuit 20 with a red LED (or array of red LEDs) located in the center position. Color chart 42 is overlayed on the color chart of FIG. 1B. Color chart 42 depicts a reachable gamut 43 (matches gamut 2.1 from FIG. 1B) from the use of RB-RG-BG in circuit 20 for 2700K to 6000K and gamut 44 from the use of RG-RB-R in circuit 20 for 2500K and below. Gamut 43 may be provided with high efficiency. Gamut 44 may be provided with a reduced efficiency. The combination of gamut 43 and gamut 44 from the circuit 20 approximate the gamut 2 described above with respect to FIG. 1A. While the combination of gamut 43 and gamut 44 does not completely cover all of gamut 2, the combination of gamut 43 and gamut 44 may be sufficient for many applications, and may be a reasonable tradeoff for the increased efficiency achieved by the hybrid circuit 20, FIG. 1F illustrates a color chart 45 for the circuit 20 with a green LED (or array of green LEDs) located in the center position. Color chart 45 is overlayed on the color chart of FIG. 1B. Color chart 45 depicts a reachable gamut 43 (matches gamut 2.1 from FIG. 1B) from the use of RB-RG-BG in circuit 20 for 2700K to 6000K and gamut 46 from the use of RG-GB-G in circuit 20 for above BBL 6. Gamut 43 may be provided with high efficiency. Gamut 46 may be provided with a reduced efficiency. The combination of gamut 43 and gamut 46 from the circuit 20 approximate the gamut 2 described above with respect to FIG. 1A. While the combination of gamut 43 and gamut 46 does not completely cover all of gamut 2, the combination of gamut 43 and gamut 46 may be sufficient for many applications, and may be a reasonable tradeoff for the increased efficiency achieved by the hybrid circuit 20.

Figure 1G:
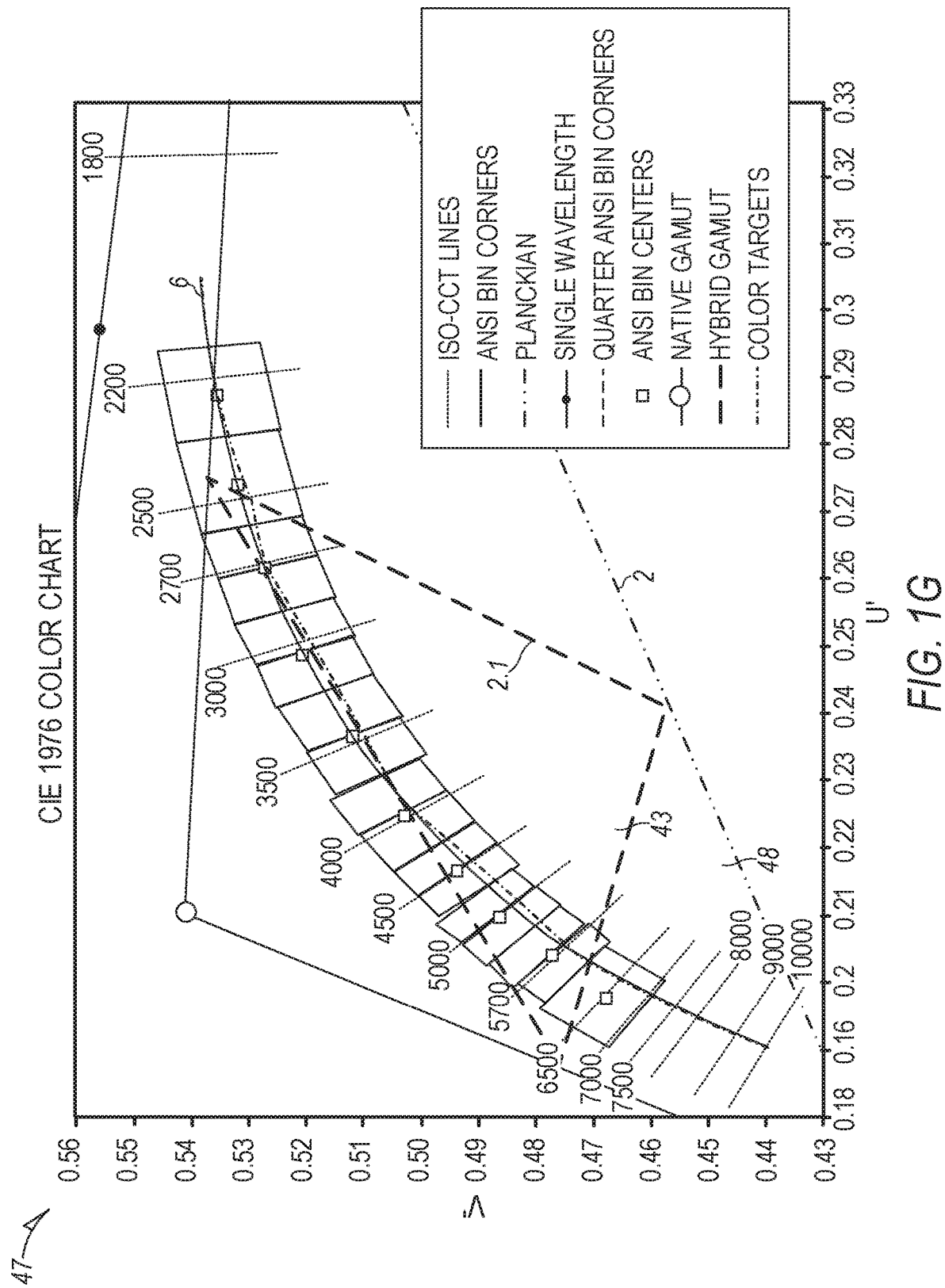
FIG. 1G illustrates a color chart for the circuit of FIG. 1C with a blue LED (or array of blue LEDs) located in the center position.

FIG. 1G illustrates a color chart 47 for the circuit 20 with a blue LED (or array of blue LEDs) located in the center position. Color chart 47 is overlayed on the color chart of FIG. 1B. Color chart 47 depicts a reachable gamut 43 (matches gamut 2.1 from FIG. 1B) from the use of RB-RG-BG in circuit 20 for 2700K to 6000K and gamut 48 from the use of GB-RB-B in circuit 20 for beyond 6500K. Gamut 43 may be provided with high efficiency. Gamut 48 may be provided with a reduced efficiency. The combination of gamut 43 and gamut 48 from the circuit 20 approximate the gamut 2 described above with respect to FIG. 1A. While the combination of gamut 43 and gamut 48 does not completely cover all of gamut 2, the combination of gamut 43 and gamut 48 may be sufficient for many applications, and may be a reasonable tradeoff for the increased efficiency achieved by the hybrid circuit 20.

Figure 1H:
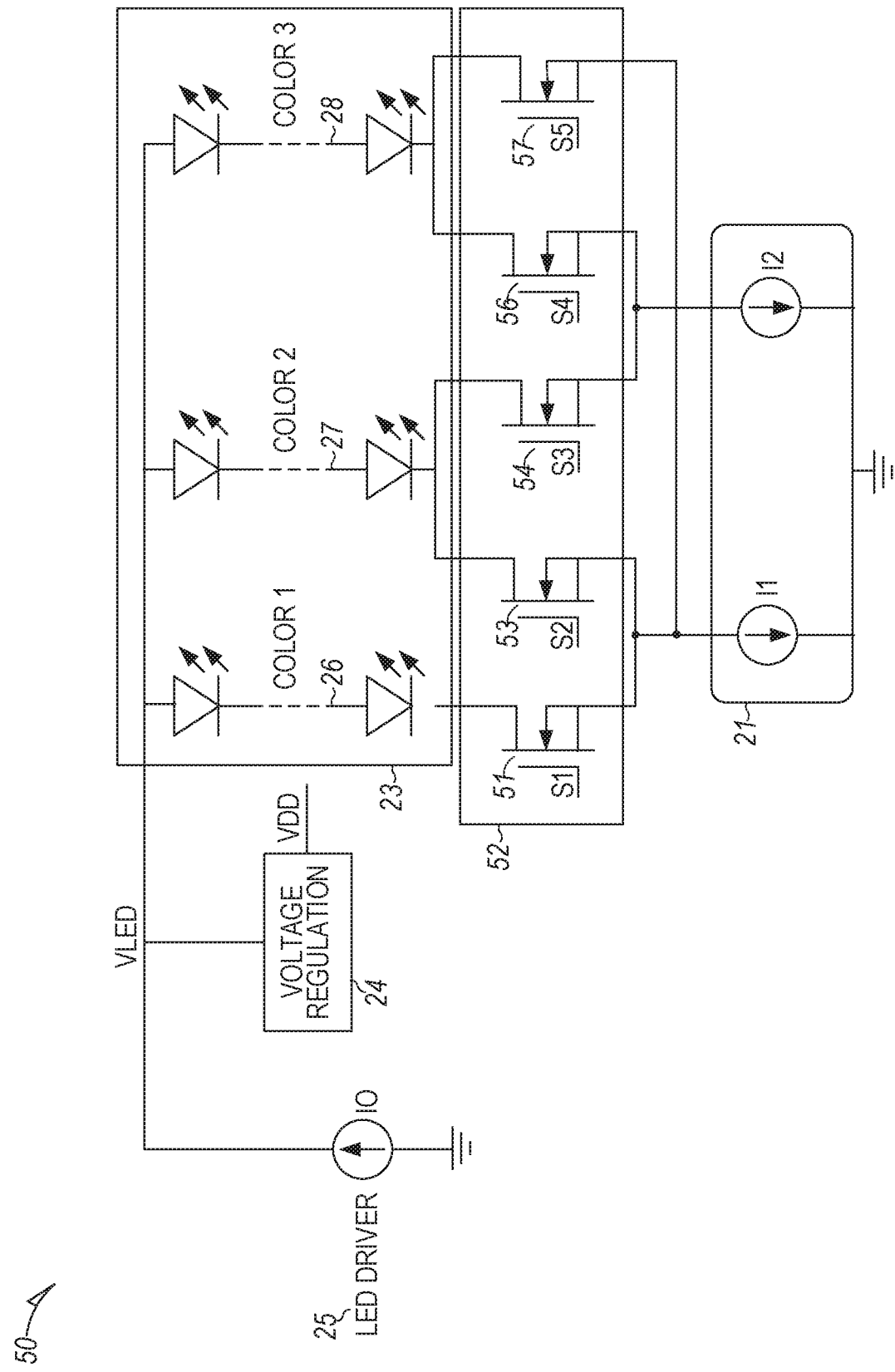
FIG. 1H illustrates another hybrid driving circuit.

From FIGS. 1E, 1F, 1G, it is evident that all portions of gamut 2 may be reached by simply varying the LED located in the center of circuit 20. In each configuration of LEDs gamut 2.1 is covered plus an additional portion of gamut 2. Such coverage may be sufficient for many applications and may be a tradeoff for the increased efficiency, FIG. 1H illustrates another hybrid driving circuit 50. Circuit 50 may provide an increased gamut from circuit 20. Circuit 50 includes analog current division circuit 21, LED array 23, voltage regulator 24, and LED driver 25 as described herein above with respect to FIG. 1C. As in FIG. 1C. LED array 23 may include one or a plurality of color 1 LEDs 26, one or a plurality of color 2 LEDs 27, and one or a plurality of color 3 LEDs 28 designed to be tuned using the hybrid driving circuit. A multiplexer array 52 is utilized in circuit 50. In one embodiment of circuit 50, color 1 is green, color 2 is red and color 3 is blue, although any set of colors may be used for color 1, color 1 and color 3. As is understood, the assigning of colors to particular channels is simply a design choice, and while may other designs are contemplated the current description uses color 1 LED 26, color 2 LED 27 and color 3 LED 28, and also may describe embodiments where color 1 is described as green, color 2 is described as red, and color 3 is described as blue, in order to provide for a complete understanding of the hybrid driving circuit described herein.

Multiplexer array 52 that electrically connects two of the three LEDs 26, 27, 28 to the two current sources $I_1$, $I_2$ created with the analog current division circuit 21. Multiplexer array 52, as illustrated in circuit 50, may include five MOSFETs S1 (51), S2 (53), S3 (54), S4 (56), S5 (57), also referred to as switches. Multiplexer array 52 directs $I_1$ and $I_2$ into two of the colors of LED array 23 per time. Control of MOSFET S1 51, MOSFET S4 56 and X are needed as MOSFET S2 53 and MOSFET S3 54 are the inverted value of MOSFET S1 51 and MOSFET S4 56 and MOSFET S5 57 is the inverted combination of MOSFET S1 51 and MOSFET S2 53. Specifically, $$S2=\overline{(S1+X)}, \qquad \text{Equation 5.}$$

$$S3=\overline{S4}, \qquad \text{Equation 6.}$$

$$S5=\overline{(S1+S2)}, \qquad \text{Equation 7,}$$

Table 5 illustrates the possible combinations provided by circuit 50. The utilization of the LEDs in array 23 for the embodiment where color 1 green, color 2 red, and color 3 blue is shown in Table 5,

TABLE 5

Operational Values for Five Switches

| Color I1 | Color I2 | S1 | S2 | S3 | S4 | S5 |
|---|---|---|---|---|---|---|
| R | R | 0 | 1 | 1 | 0 | 0 |
| R | B | 0 | 1 | 0 | 1 | 0 |
| R | G | 1 | 0 | 1 | 0 | 0 |
| G | B | 1 | 0 | 0 | 1 | 0 |
| B | R | 0 | 0 | 1 | 0 | 1 |
| B | B | 0 | 0 | 0 | 1 | 1 |

Figure 1I:
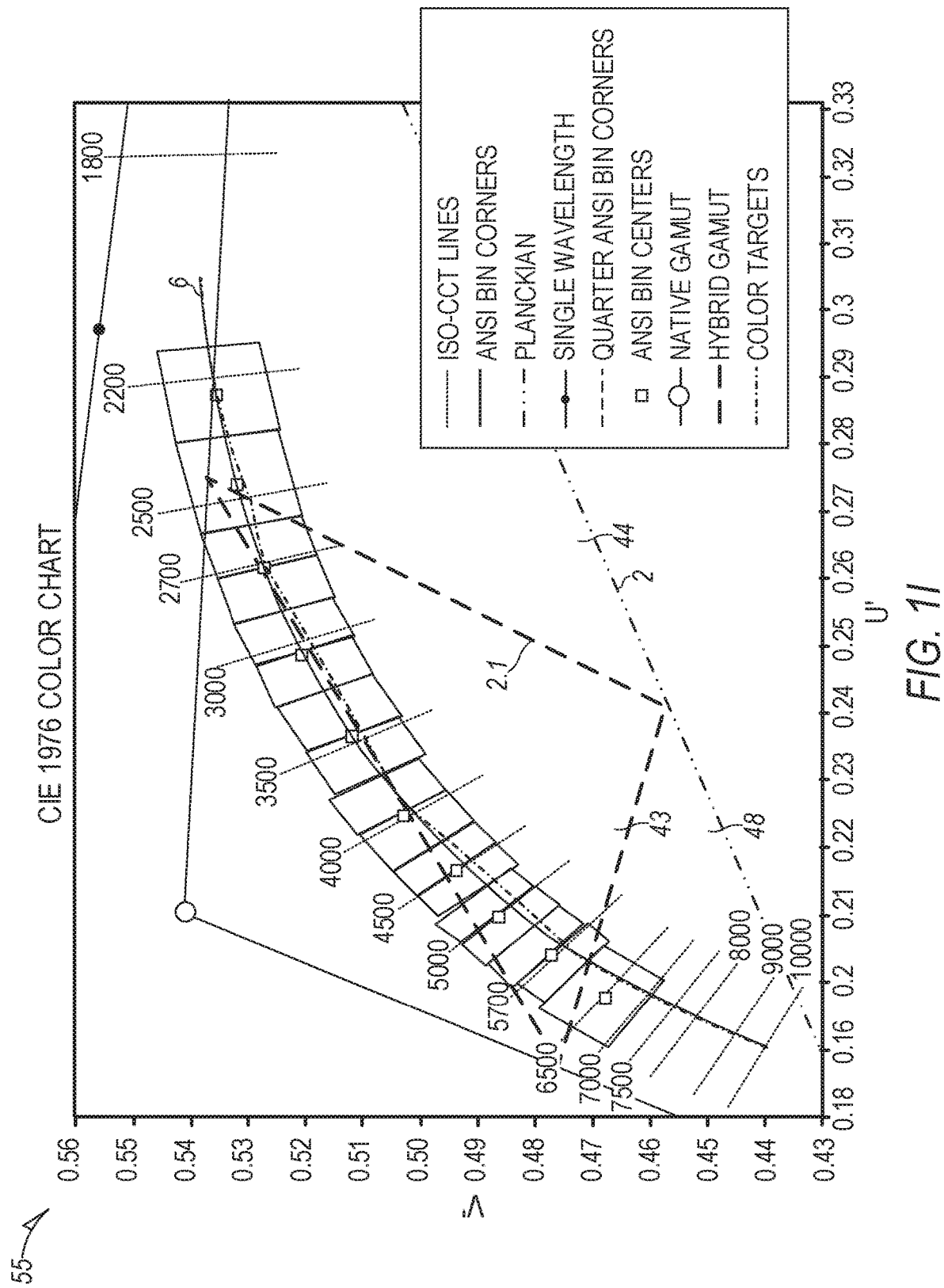
FIG. 1I illustrates a color chart for the circuit of FIG. 1H with a red and blue LEDs (or array of red LEDs and an array of blue LEDs) driven by the analog currents.

FIG. 1I illustrates a color chart 55 for the circuit 50 with a red and blue LEDs (or array of red LEDs and an array of blue LEDs) driven by the analog currents. Color chart 55 is overlayed on the color chart of FIG. 1B. Color chart 55 depicts a reachable gamut 43 (matches gamut 2.1 from FIG. 1B), gamut 44, and gamut 48. Gamut 43 may be provided with high efficiency. Gamuts 44, 48 may be provided with a reduced efficiency. The combination of gamuts 43, 44, 48 from the circuit 50 approximate the gamut 2 described above with respect to FIG. 1A. While the combination of gamut 43, 44, 48 does not completely cover all of gamut 2, the combination of gamut 43, 44, 48 may be sufficient for many applications, and may be a reasonable tradeoff for the increased efficiency achieved by the hybrid circuit 50.

Figure 1J:
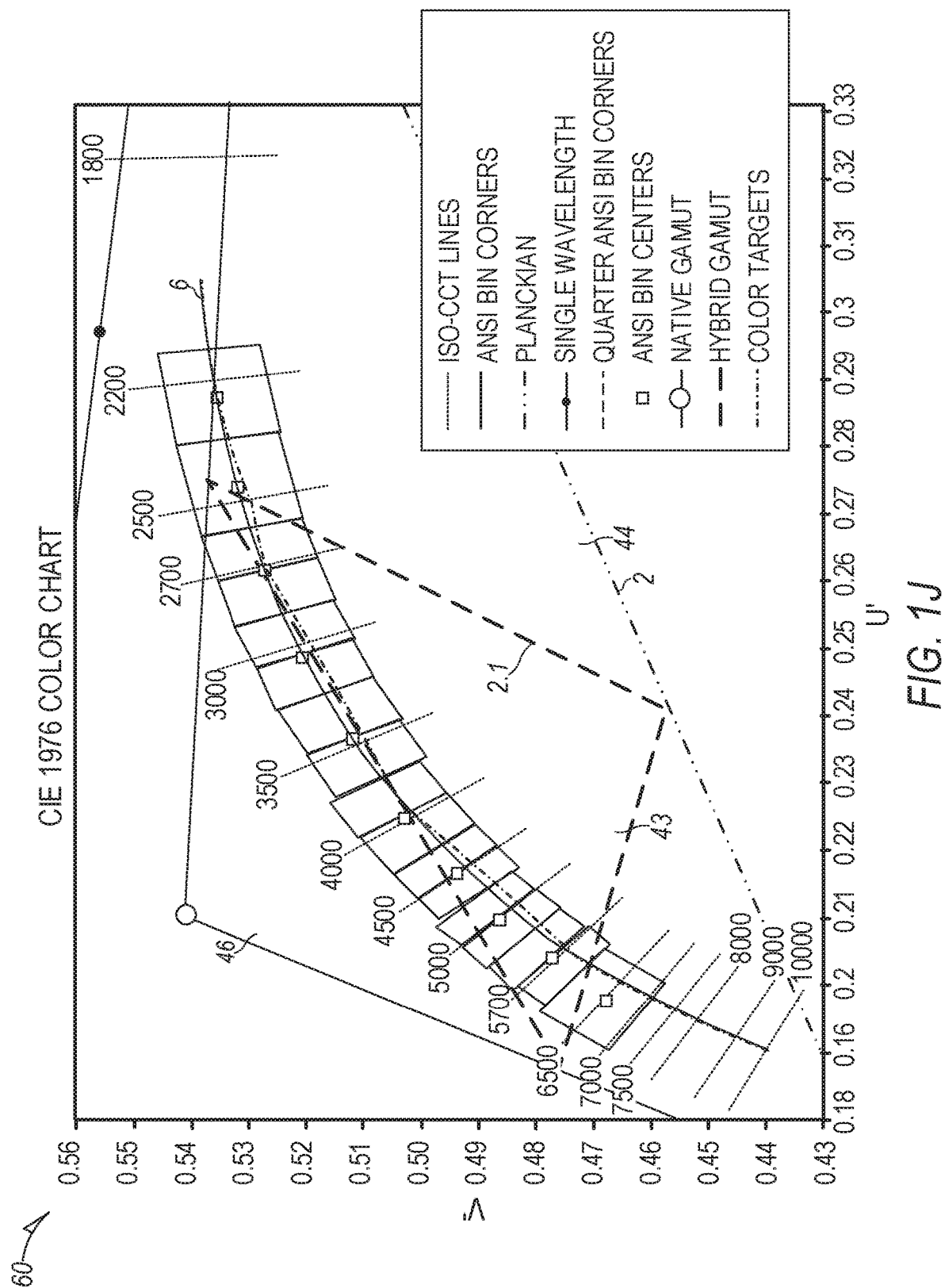
FIG. 1J illustrates a color chart for the circuit of FIG. 1H with a red and green LEDs (or array of red LEDs and an array of green LEDs) driven by the analog currents.

FIG. 1J illustrates a color chart 60 for the circuit 50 with a red and green LEDs (or array of red LEDs and an array of green LEDs) driven by the analog currents. Color chart 60 is overlayed on the color chart of FIG. 1B. Color chart 60 depicts a reachable gamut 43 (matches gamut 2.1 from FIG. 1B), gamut 44, and gamut 46. Gamut 43 may be provided with high efficiency. Gamuts 44, 46 may be provided with a reduced efficiency. The combination of gamuts 43, 44, 46 from the circuit 50 approximate the gamut 2 described above with respect to FIG. 1A. While the combination of gamut 43, 44, 46 does not completely cover all of gamut 2, the combination of gamut 43, 44, 46 may be sufficient for many applications, and may be a reasonable tradeoff for the increased efficiency achieved by the hybrid circuit 50.

Figure 1K:
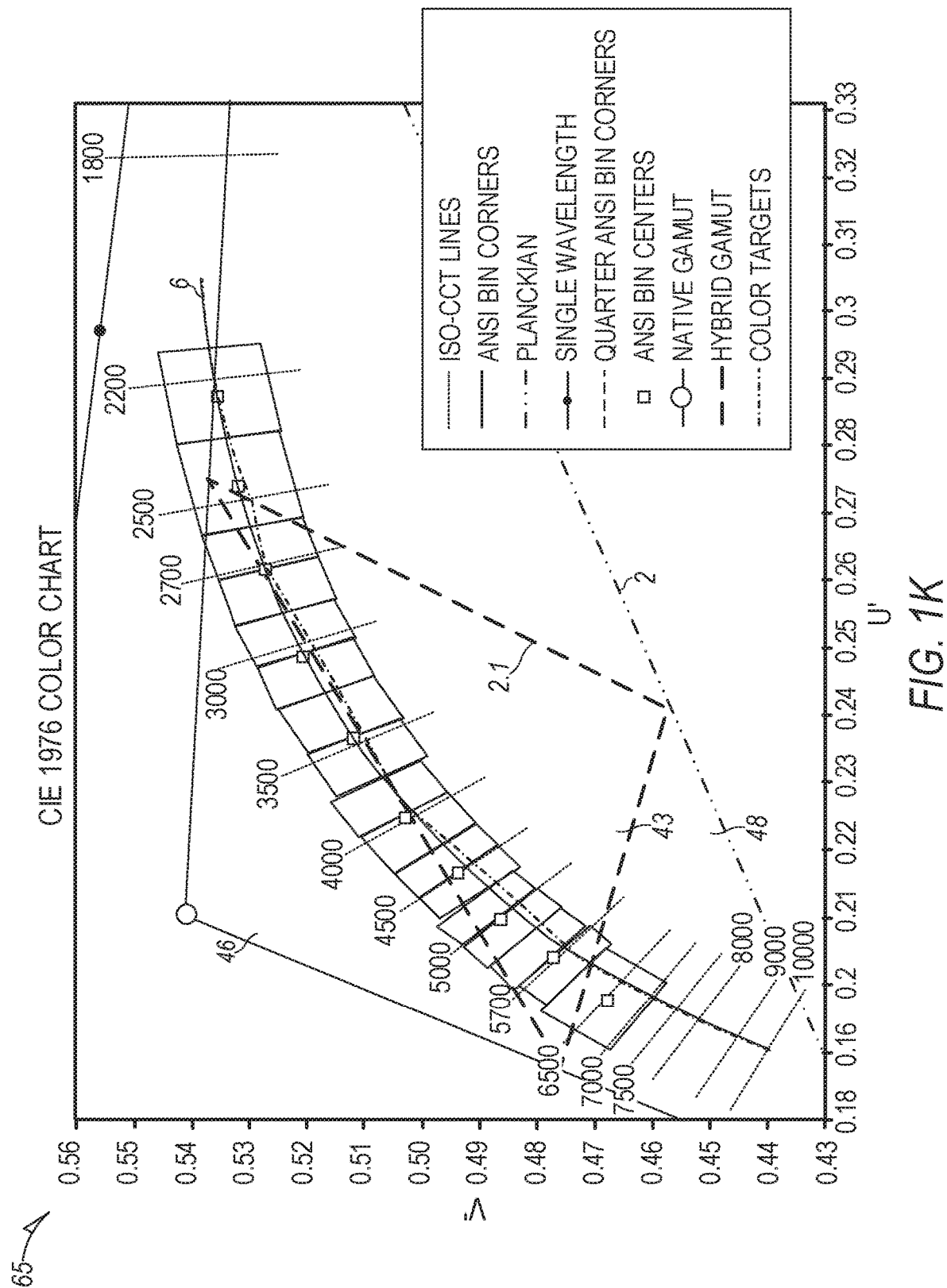
FIG. 1K illustrates a color chart for the circuit of FIG. 1H with a blue and green LEDs (or array of blue LEDs and an array of green LEDs) driven by the analog currents.

FIG. 1K illustrates a color chart 65 for the circuit 50 with a blue and green LEDs (or array of blue LEDs and an array of green LEDs) driven by the analog currents. Color chart 65 is overlayed on the color chart of FIG. 1B. Color chart 65 depicts a reachable gamut 43 (matches gamut 2.1 from FIG. 1B), gamut 46, and gamut 48. Gamut 43 may be provided with high efficiency. Gamuts 46, 48 may be provided with a reduced efficiency. The combination of gamuts 43, 46, 48 from the circuit 50 approximate the gamut 2 described above with respect to FIG. 1A. While the combination of gamut 43, 46, 48 does not completely cover all of gamut 2, the combination of gamut 43, 46, 48 may be sufficient for many applications, and may be a reasonable tradeoff for the increased efficiency achieved by the hybrid circuit 50.

Figure 1L:
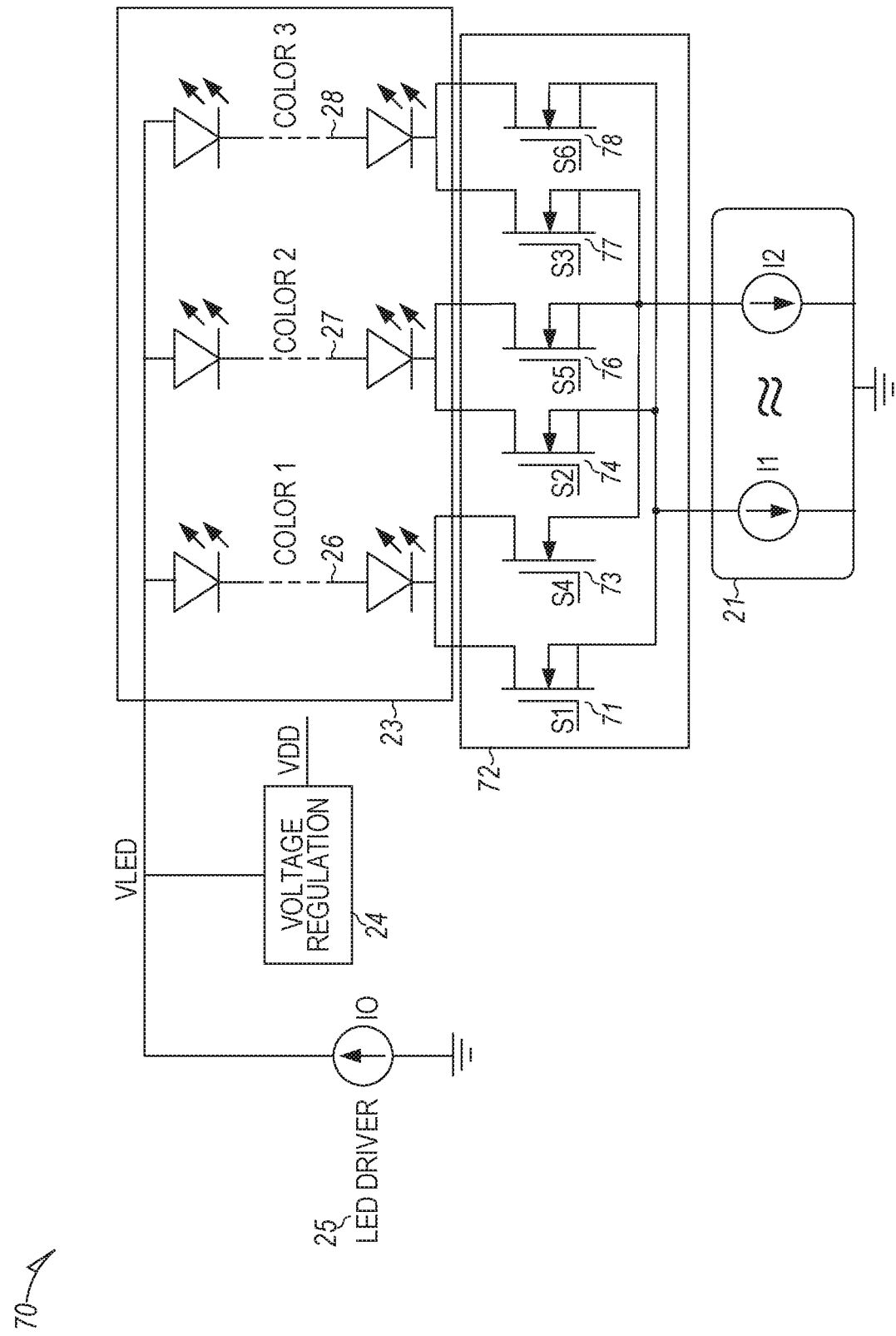
FIG. 1L illustrates another hybrid driving circuit.

FIG. 1L illustrates another hybrid driving circuit 70. Circuit 70 may provide an increased gamut from circuits 20, 50. Circuit 70 includes analog current division circuit 21, LED array 23, voltage regulator 24, and LED driver 25 as described herein above with respect to FIG. 1C. As in FIG. 1C, LED array 23 may include one or a plurality of color 1 LEDs 26, one or a plurality of color 2 LEDs 27, and one or a plurality of color 3 LEDs 28 designed to be tuned using the hybrid driving circuit. A multiplexer array 72 is utilized in circuit 70. In one embodiment of circuit 70, color 1 is green, color 2 is red and color 3 is blue, although any set of colors may be used for color 1, color 1 and color 3. As is understood, the assigning of colors to particular channels is simply a design choice, and while may other designs are contemplated the current description uses color 1 LED 26, color 2 LED 27 and color 3 LED 28, and also may describe embodiments where color 1 is described as green, color 2 is described as red, and color 3 is described as blue, in order to provide for a complete understanding of the hybrid driving circuit described herein.

Multiplexer array 72 that electrically connects two of the three LEDs 26, 27, 28 to the two current sources $I_1$, $I_2$ created with the analog current division circuit 21. Multiplexer array 72, as illustrated in circuit 70, may include six MOSFETs S1, S2, S3, S4, S5, S6, also referred to as switches. Multiplexer array 72 directs $I_1$ and $I_2$ into two of the colors of LED array 23 per time. Control of MOSFET S1, MOSFET S4 and $X_1$, $X_2$ are needed as MOSFET 52, MOSFET S3 and MOSFET S5 are the inverted value of MOSFET S1 and MOSFET S4, and MOSFET S6 is the inverted combination of MOSFET S4 and MOSFET S5. Specifically, $$S2=\overline{(S1+X1)}, \hspace{2cm} \text{Equation 8,}$$

$$S3=\overline{(S1+S2)}, \hspace{2cm} \text{Equation 9,}$$

$$S5=\overline{(S4+X2)}, \hspace{2cm} \text{Equation 10,}$$

$$S6=\overline{(S4+S5)}, \hspace{2cm} \text{Equation 11.}$$

Table 6 illustrates the possible combinations provided by circuit 70. The utilization of the LEDs in array 23 for the embodiment where color 1 green, color 2 red, and color 3 blue is shown in Table 6.

TABLE 6

Operational Values of Six Switches

| Color I1 | Color I2 | S1 | S2 | S3 | S4 | S5 | S6 |
|---|---|---|---|---|---|---|---|
| R | R | 1 | 0 | 0 | 1 | 0 | 0 |
| R | G | 1 | 0 | 0 | 0 | 1 | 0 |
| R | B | 1 | 0 | 0 | 0 | 0 | 1 |
| G | R | 0 | 1 | 0 | 1 | 0 | 0 |
| G | G | 0 | 1 | 0 | 0 | 1 | 0 |
| G | B | 0 | 1 | 0 | 0 | 0 | 1 |
| B | R | 0 | 0 | 1 | 1 | 0 | 0 |
| B | G | 0 | 0 | 1 | 0 | 1 | 0 |
| B | B | 0 | 0 | 1 | 0 | 0 | 1 |

By alternating the same color between I1 and I2, any mismatch between I1 and I2 may be averaged out, such as by chopping, for example.

Figure 1M:
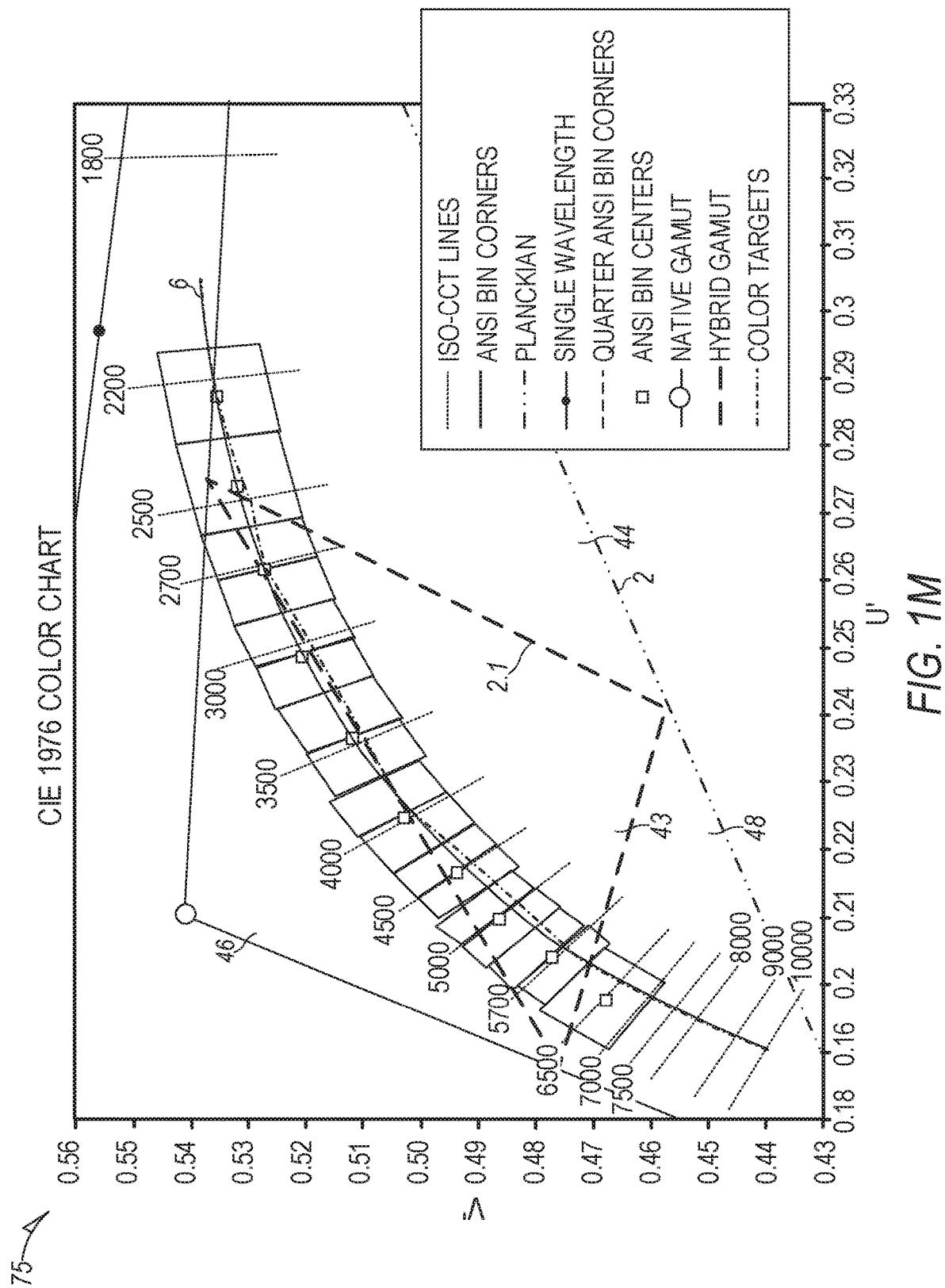
FIG. 1M illustrates a color chart for the circuit of FIG. 1L providing full gamut coverage.

FIG. 1M illustrates a color chart 75 for the circuit 70 providing full gamut 2 coverage. Color chart 75 is overlayed on the color chart of FIG. 1B. Color chart 75 depicts a full reachable gamut 43, 44, 46, 48 that matches gamut described above with respect to FIG. 1A.

Figure 1N:
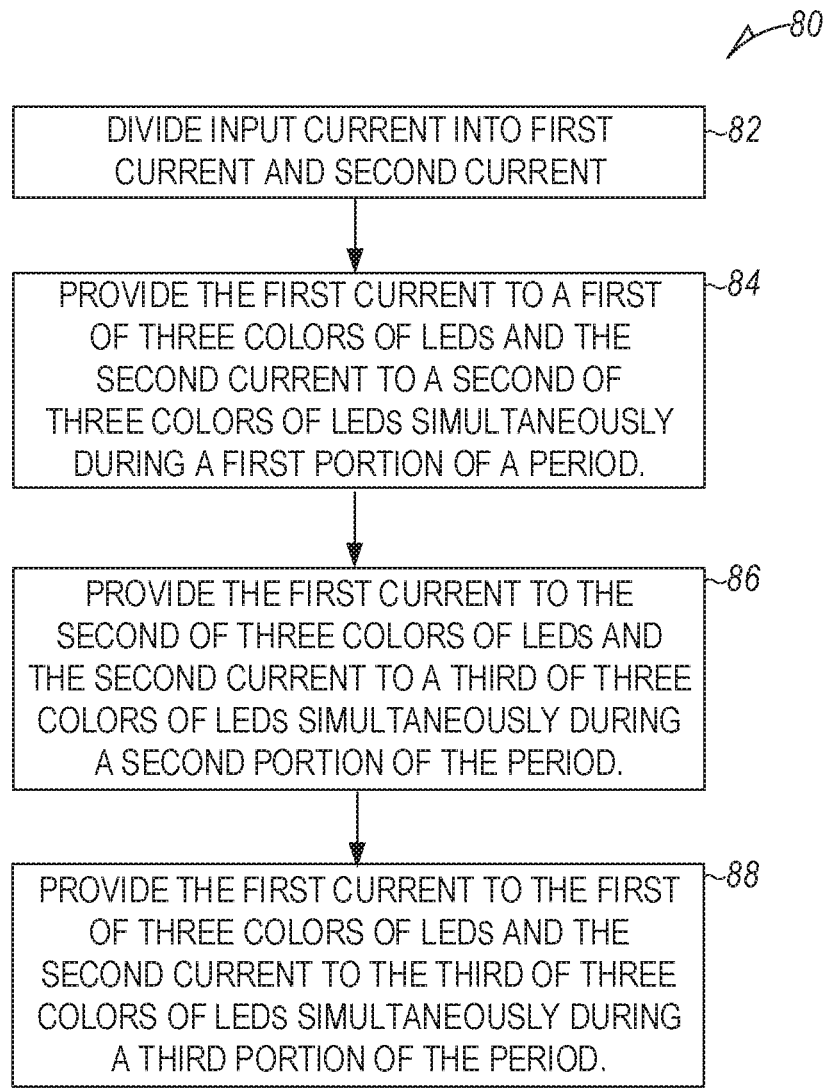
FIG. 1N illustrates a method of hybrid driving for RGB color tuning driving.

FIG. 1N illustrates a method 80 of hybrid driving for RGB color tuning driving. Method 80 may be employed with circuit 20, circuit 50, or circuit 70 to produce ½ gamut, ¾ gamut and full gamut outputs as described herein. Method 80 divides an input current, via an analog current division circuit, into a first current and a second current at step 82. At step 84, method 80 provides, via a multiplexer array, the first current to a first of three colors of LEDs and the second current to a second of three colors of LEDs simultaneously during a first portion of a period. At step 86, method 80 provides, via the multiplexer array, the first current to the second of three colors of LEDs and the second current to a third of three colors of LEDs simultaneously during a second portion of the period. At step 88, method 80; provides, via the multiplexer array, the first current to the first of three colors of LEDs and the second current to the third of three colors of LEDs simultaneously during a third portion of the period. In method 80 the splicing of the first current and second current to different duplets of the LEDs may occur using pulse width modulation (PWM) time slicing to provide a drive to a third of three colors of LEDs. In method 80, the PWM may be substantially equal between the combination of the first of three colors of LEDs and second of three colors of LEDs, and the third of three colors of LEDs, or different depending on the desired drive characteristics of the LEDs.

Figure 2:
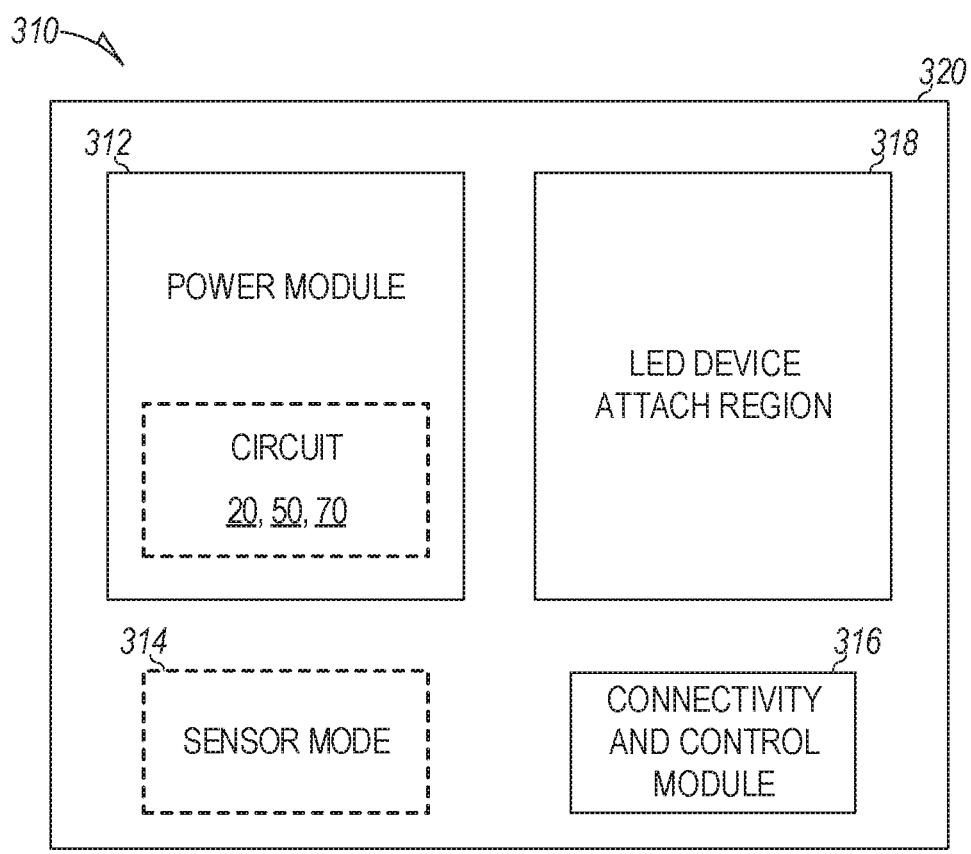
FIG. 2 is a top view of an electronics board for an integrated LED lighting system according to one embodiment.

FIG. 2 is a top view of an electronics board 310 for an integrated LED lighting system according to one embodiment. In alternative embodiments, two or more electronics boards may be used for the LED lighting system. For example, the LED array may be on a separate electronics board, or the sensor module may be on a separate electronics board. In the illustrated example, the electronics board 310 includes a power module 312, a sensor module 314, a connectivity and control module 316 and an LED attach region 318 reserved for attachment of an LED array to a substrate 320.

The substrate 320 may be any board capable of mechanically supporting, and providing electrical coupling to, electrical components, electronic components and/or electronic modules using conductive connectors, such as tracks, traces, pads, vias, and/or wires. The substrate 320 may include one or more metallization layers disposed between, or on, one or more layers of non-conductive material, such as a dielectric composite material. The power module 312 may include electrical and/or electronic elements. In an example embodiment, the power module 312 includes an AC/DC conversion circuit, a DC/DC conversion circuit, a dimming circuit, and an LED driver circuit. One of circuit 20, 50, 70 may be included within power module 312.

The sensor module 314 may include sensors needed for an application in which the LED array is to be implemented. Example sensors may include optical sensors (e.g., IR sensors and image sensors), motion sensors, thermal sensors, mechanical sensors, proximity sensors, or even timers. By way of example, LEDs in street lighting, general illumination, and horticultural lighting applications may be turned off/on and/or adjusted based on a number of different sensor inputs, such as a detected presence of a user, detected ambient lighting conditions, detected weather conditions, or based on time of day/night. This may include, for example, adjusting the intensity of light output, the shape of light output, the color of light output, and/or turning the lights on or off to conserve energy. For AR/VR applications, motion sensors may be used to detect user movement. The motion sensors themselves may be LEDs, such as IR detector LEDs. By way of another example, for camera flash applications, image and/or other optical sensors or pixels may be used to measure lighting for a scene to be captured so that the flash lighting color, intensity illumination pattern, and/or shape may be optimally calibrated. In alternative embodiments, the electronics board 310 does not include a sensor module.

The connectivity and control module 316 may include the system microcontroller and any type of wired or wireless module configured to receive a control input from an external device. By way of example, a wireless module may include blue tooth. Zigbee, Z-wave, mesh, WiFi, near field communication (NFC) and/or peer to peer modules may be used. The microcontroller may be any type of special purpose computer or processor that may be embedded in an LED lighting system and configured or configurable to receive inputs from the wired or wireless module or other modules in the LED system (such as sensor data and data fed back from the LED module) and provide control signals to other modules based thereon. Algorithms implemented by the special purpose processor may be implemented in a computer program, software, or firmware incorporated in a non-transitory computer-readable storage medium for execution by the special purpose processor. Examples of non-transitory computer-readable storage mediums include a read only memory (ROM), a random access memory (RAM), a register, cache memory, and semiconductor memory devices. The memory may be included as part of the microcontroller or may be implemented elsewhere, either on or off the electronics board 310. One of circuit 20, 50, 70 may be included within connectivity and control module 316.

The term module, as used herein, may refer to electrical and/or electronic components disposed on individual circuit boards that may be soldered to one or more electronics boards 310. The term module may, however, also refer to electrical and/or electronic components that provide similar functionality, but which may be individually soldered to one or more circuit boards in a same region or in different regions.

Figure 3A:
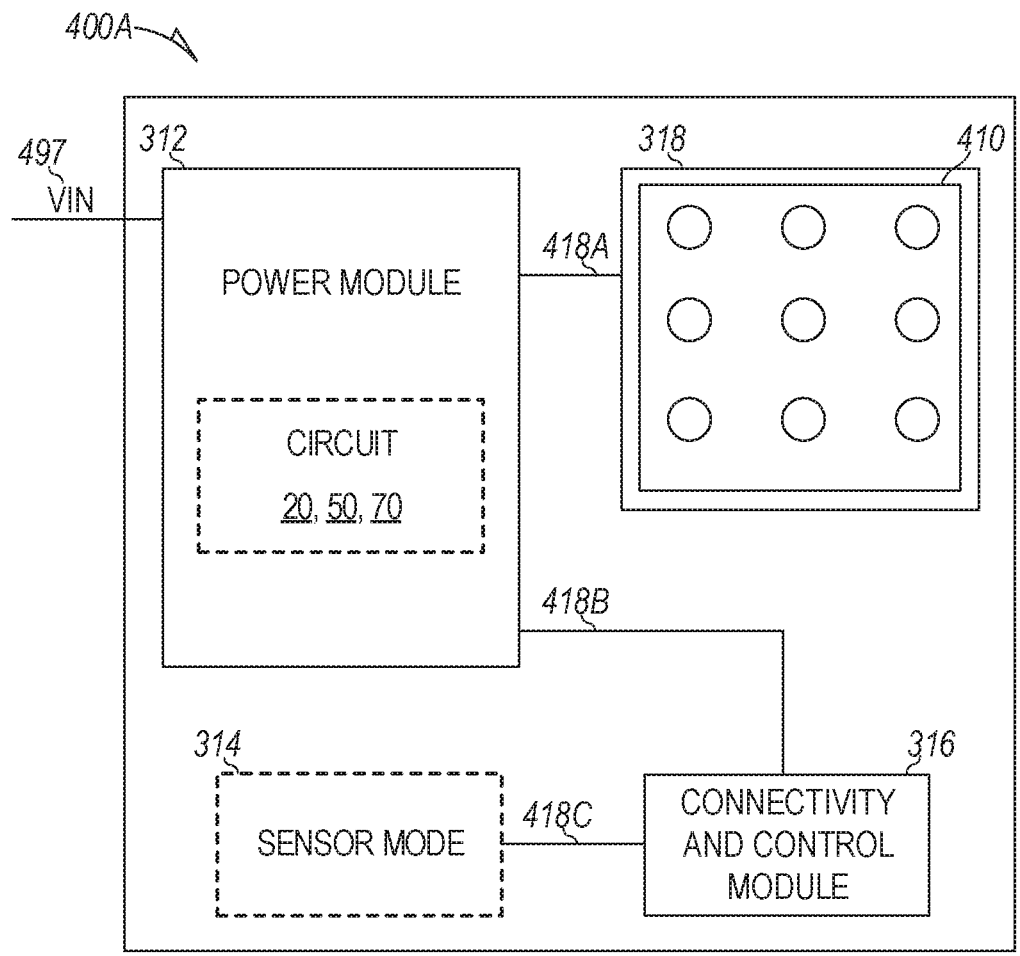
FIG. 3A is a top view of the electronics board with LED array attached to the substrate at the LED device attach region in one embodiment.

FIG. 3A is a top view of the electronics board 310 with an LED array 410 attached to the substrate 320 at the LED device attach region 318 in one embodiment. The electronics board 310 together with the LED array 410 represents an LED lighting system 400A. Additionally, the power module 312 receives a voltage input at Vin 497 and control signals from the connectivity and control module 316 over traces 418B, and provides drive signals to the LED array 410 over traces 418A. The LED array 410 is turned on and off via the drive signals from the power module 312. In the embodiment shown in FIG. 3A, the connectivity and control module 316 receives sensor signals from the sensor module 314 over traces 418. One of circuit 20, 50, 70 may be included within power module 312 and/or connectivity and control module 316.

Figure 3B:
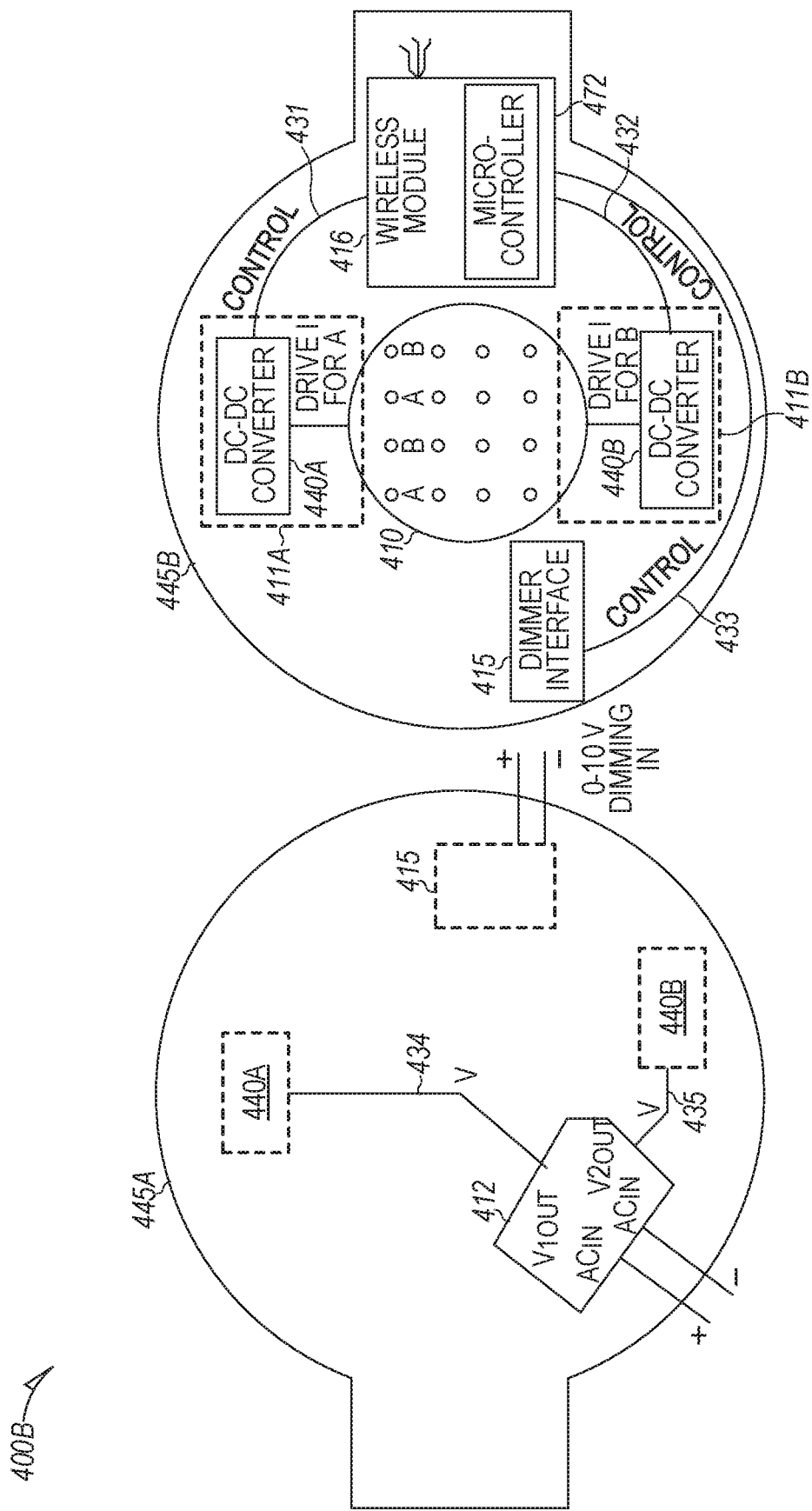
FIG. 3B is a diagram of one embodiment of a two channel integrated LED lighting system with electronic components mounted on two surfaces of a circuit board.

FIG. 3B illustrates one embodiment of a two channel integrated LED lighting system with electronic components mounted on two surfaces of a circuit board 499. As shown in FIG. 3B, an LED lighting system 400B includes a first surface 445A having inputs to receive dimmer signals and AC power signals and an AC/DC converter circuit 412 mounted on it. The LED system 400B includes a second surface 445B with the dimmer interface circuit 415, DC-DC converter circuits 440A and 440B, a connectivity and control module 416 (a wireless module in this example) having a microcontroller 472, and an LED array 410 mounted on it. The LED array 410 is driven by two independent channels 411A and 411B. In alternative embodiments, a single channel may be used to provide the drive signals to an LED array, or any number of multiple channels may be used to provide the drive signals to an LED array. For example, FIG. 3E illustrates an LED lighting system 400D having 3 channels and is described in further detail below.

The LED array 410 may include two groups of LED devices. In an example embodiment, the LED devices of group A are electrically coupled to a first channel 411A and the LED devices of group B are electrically coupled to a second channel 411B. Each of the two DC-DC converters circuits 440A and 440B may provide a respective drive current via single channels 411A and 411B, respectively, for driving a respective group of LEDs A and B in the LED array 410. The LEDs in one of the groups of LEDs may be configured to emit light having a different color point than the LEDs in the second group of LEDs. Control of the composite color point of light emitted by the LED array 410 may be tuned within a range by controlling the current and/or duty cycle applied by the individual DC/DC converter circuits 440A and 440B via a single channel 411A and 411B, respectively. Although the embodiment shown n FIG. 3B does not include a sensor module (as described in FIG. 2 and FIG. 3A), an alternative embodiment may include a sensor module.

The illustrated LED lighting system 400B is an integrated system in which the LED array 410 and the circuitry for operating the LED array 410 are provided on a single electronics board. Connections between modules on the same surface of the circuit board 499 may be electrically coupled for exchanging, for example, voltages, currents, and control signals between modules, by surface or sub-surface interconnections, such as traces 431, 432, 433, 434 and 435 or metallizations (not shown). Connections between modules on opposite surfaces of the circuit board 499 may be electrically coupled by through board interconnections, such as vias and metallizations (not shown).

Figure 3C:
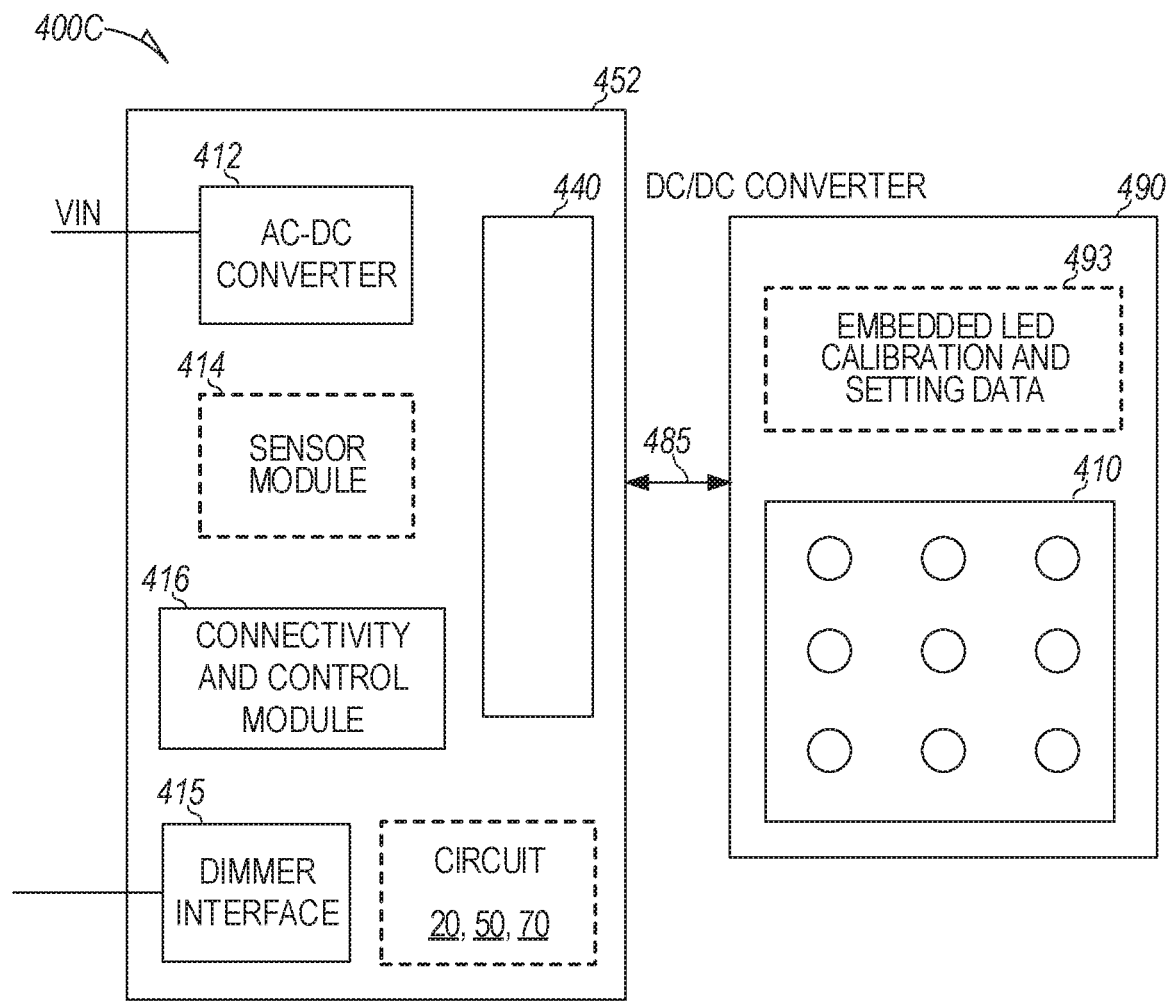
FIG. 3C is a diagram of an embodiment of an LED lighting system where the LED array is on a separate electronics board from the driver and control circuitry.

FIG. 3C illustrates an embodiment of an LED lighting system where the LED array is on a separate electronics board from the driver and control circuitry. The LED lighting system 400C includes a power module 452 that is on a separate electronics board than an LED module 490. One of circuit 20, 50, 70 may be included within power module 452. The power module 452 may include, on a first electronics board, an AC/DC converter circuit 412, a sensor module 414, a connectivity and control module 416, a dimmer interface circuit 415 and a DC/DC converter circuit 440. The LED module 490 may include, on a second electronics board, embedded LED calibration and setting data 493 and the LED array 410. Data, control signals and/or LED driver input signals 485 may be exchanged between the power module 452 and the LED module 490 via wires that may electrically and communicatively couple the two modules. The embedded LED calibration and setting data 493 may include any data needed by other modules within a given LED lighting system to control how the LEDs in the LED array are driven. In one embodiment, the embedded calibration and setting data 493 may include data needed by the microcontroller to generate or modify a control signal that instructs the driver to provide power to each group of LEDs A and B using, for example, pulse width modulated (PWM) signals. In this example, the calibration and setting data 493 may inform the microcontroller 472 as to, for example, the number of power channels to be used, a desired color point of the composite light to be provided by the entire LED array 410, and/or a percentage of the power provided by the AC/DC converter circuit 412 to provide to each channel.

Figure 3D:
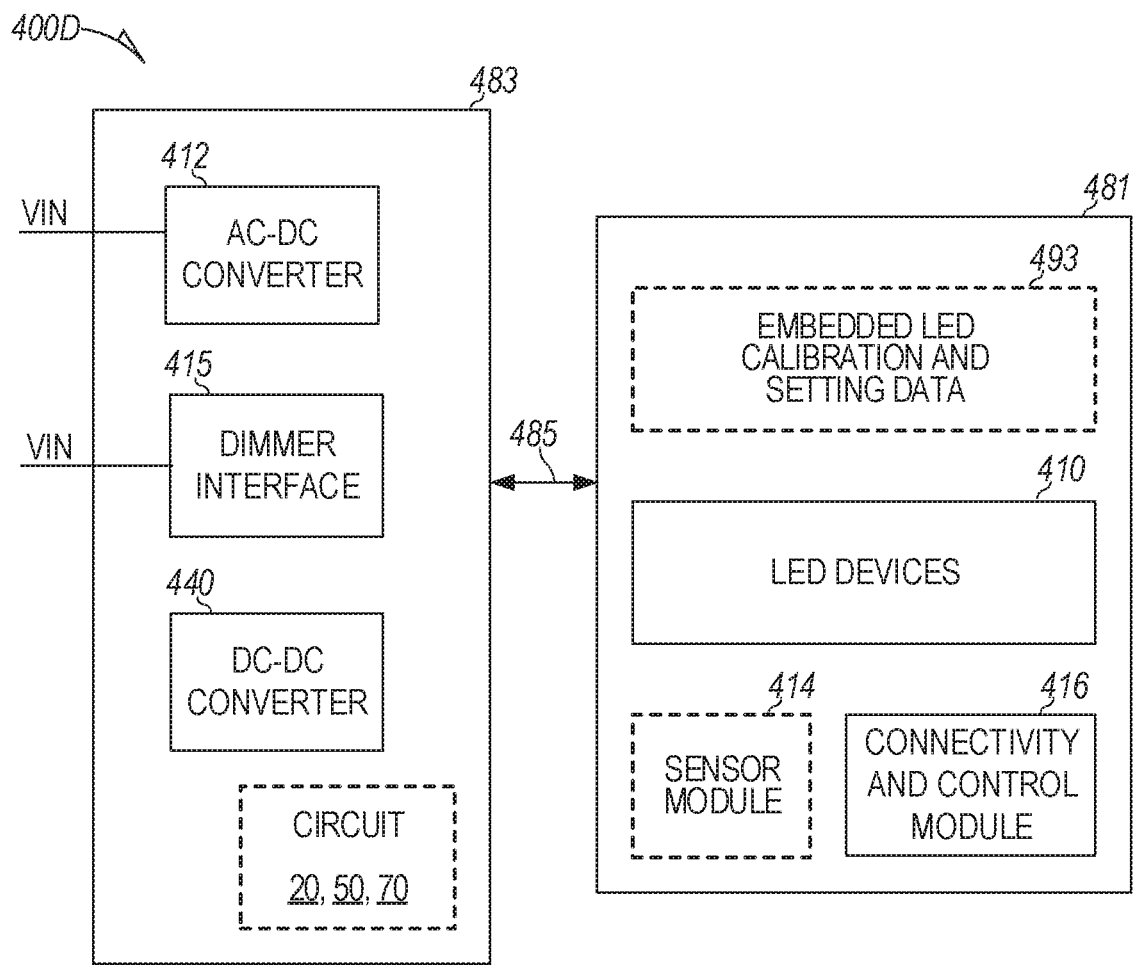
FIG. 3D is a block diagram of an LED lighting system having the LED array together with some of the electronics on an electronics board separate from the driver circuit.
Figure 3E:
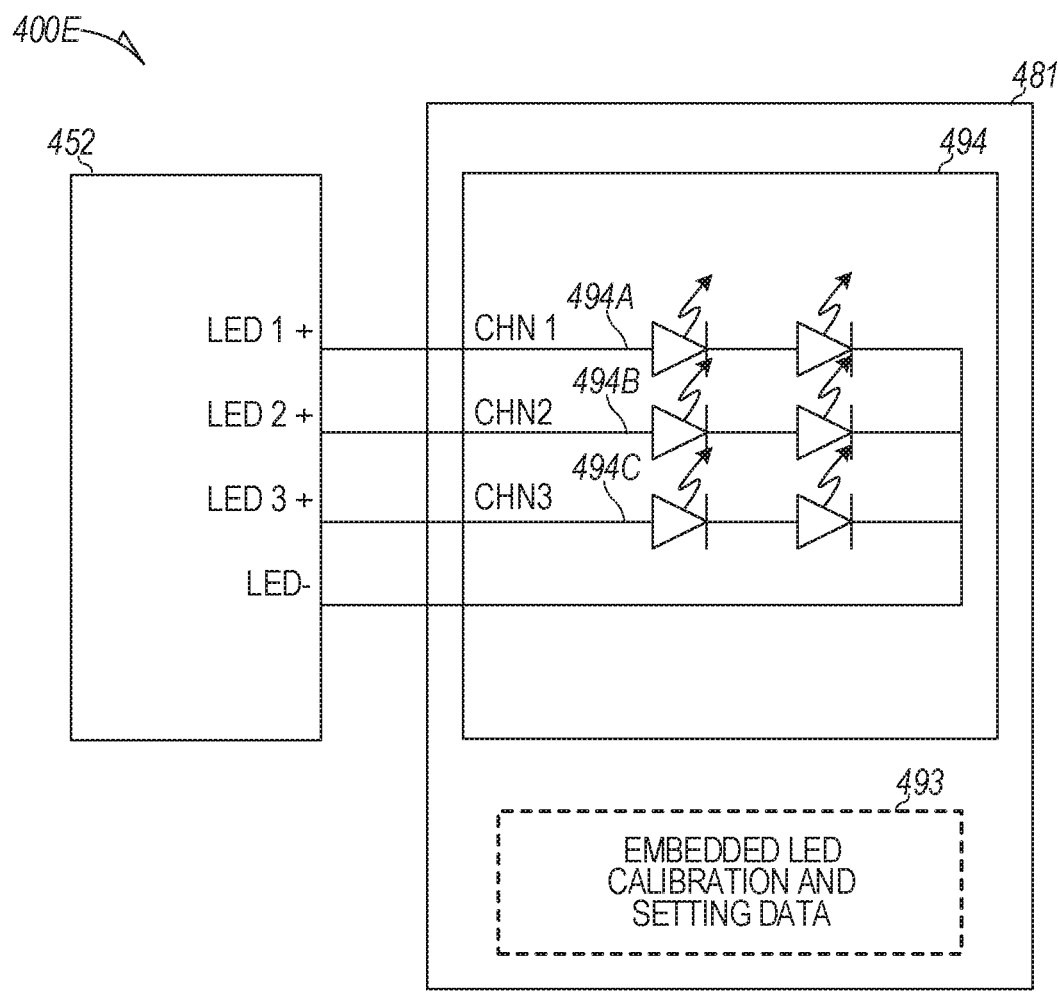
FIG. 3E is a diagram of example LED lighting system showing a multi-channel LED driver circuit.

FIG. 3D illustrates a block diagram of an LED lighting system having the LED array together with some of the electronics on an electronics board separate from the driver circuit. An LED system 400D includes a power conversion module 483 and an LED module 481 located on a separate electronics board. One of circuit 20, 50, 70 may be included within power conversion module 483. The power conversion module 483 may include the AC/DC converter circuit 412, the dimmer interface circuit 415 and the DC-DC converter circuit 440, and the LED module 481 may include the embedded LED calibration and setting data 493, LED array 410, sensor module 414 and connectivity and control module 416. The power conversion module 483 may provide LED driver input signals 485 to the LED array 410 via a wired connection between the two electronics boards.

FIG. 3E is a diagram of an example LED lighting system 400D showing a multi-channel LED driver circuit. In the illustrated example, the system 400D includes a power module 452 and an LED module 481 that includes the embedded LED calibration and setting data 493 and three groups of LEDs 494A, 494B and 494C. While three groups of LEDs are shown in FIG. 3E, one of ordinary skill in the art will recognize that any number of groups of LEDs may be used consistent with the embodiments described herein. Further, while the individual LEDs within each group are arranged in series, they may be arranged in parallel in some embodiments.

The LED array 491 may include groups of LEDs that provide light having different color points. For example, the LED array 491 may include a warm white light source via a first group of LEDs 494A, a cool white light source via a second group of LEDs 494B and a neutral while light source via a third group of LEDs 494C. The warm white light source via the first group of LEDs 494A may include one or more LEDs that are configured to provide white light having a CCT of approximately 2700K. The cool white light source via the second group of LEDs 494B may include one or more LEDs that are configured to provide white light having a COT of approximately 6500K. The neutral white light source via the third group of LEDs 494C may include one or more LEDs configured to provide light having a CCT of approximately 4000K. While various white colored LEDs are described in this example, one of ordinary skill in the art will recognize that other color combinations are possible consistent with the embodiments described herein to provide a composite light output from the LED array 491 that has various overall colors.

The power module 452 may include a tunable light engine (not shown), which may be configured to supply power to the LED array 491 over three separate channels (indicated as LED1+, LED2+ and LED3+ in FIG. 3E). More particularly, the tunable light engine may be configured to supply a first PWM signal to the first group of LEDs 494A such as warm white light source via a first channel, a second PWM signal to the second group of LEDs 494B via a second channel, and a third PWM signal to the third group of LEDs 494C via a third channel. Each signal provided via a respective channel may be used to power the corresponding LED or group of LEDs, and the duty cycle of the signal may determine the overall duration of on and off states of each respective LED. The duration of the on and off states may result in an overall light effect which may have light properties (e.g., correlated color temperature (COT), color point or brightness) based on the duration. In operation, the tunable light engine may change the relative magnitude of the duty cycles of the first, second and third signals to adjust the respective light properties of each of the groups of LEDs to provide a composite light with the desired emission from the LED array 491. As noted above, the light output of the LED array 491 may have a color point that is based on the combination (e.g., mix) of the light emissions from each of the groups of LEDs 494A, 494B and 4940.

In operation, the power module 452 may receive a control input generated based on user and/or sensor input and provide signals via the individual channels to control the composite color of light output by the LED array 491 based on the control input. In some embodiments, a user may provide input to the LED system for control of the DC/DC converter circuit by turning a knob or moving a slider that may be part of, for example, a sensor module (not shown). Additionally or alternatively, in some embodiments, a user may provide input to the LED lighting system 400D using a smartphone and/or other electronic device to transmit an indication of a desired color to a wireless module (not shown).

Figure 4:
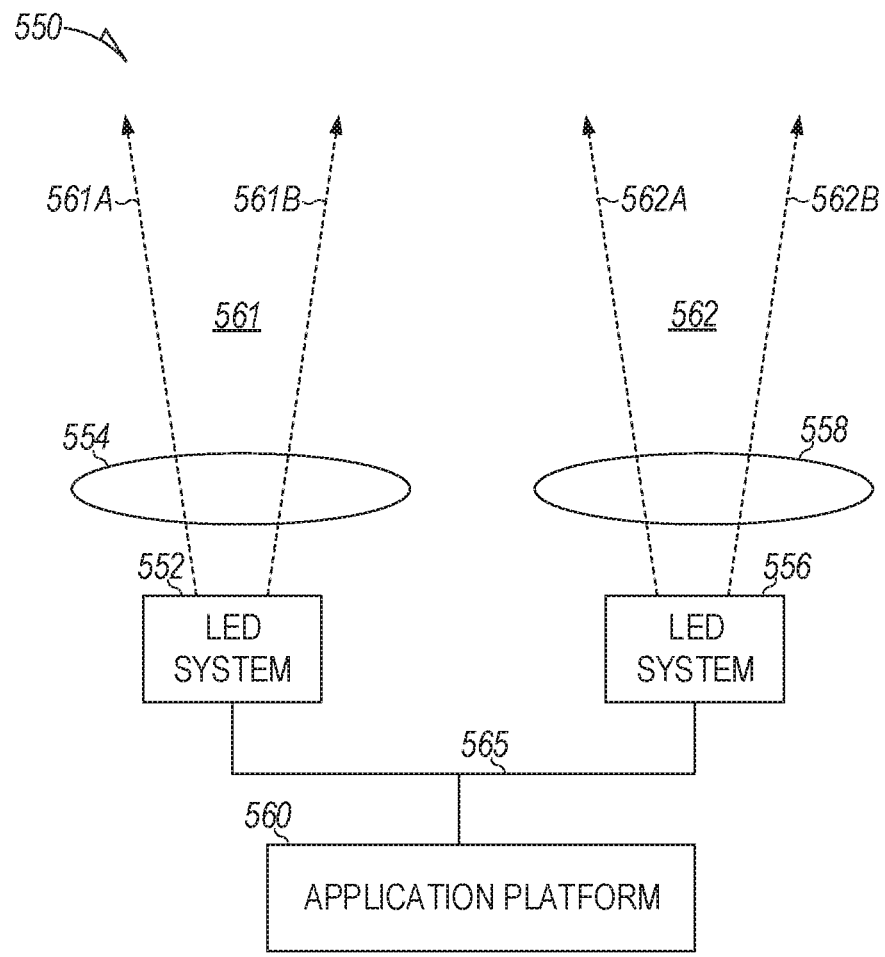
FIG. 4 is a diagram of an example application system.

FIG. 4 shows an example system 550 which includes an application platform 560, LED lighting systems 552 and 556, and secondary optics 554 and 558. The LED lighting system 552 produces light beams 561 shown between arrows 561a and 561b. The LED lighting system 556 may produce light beams 562 between arrows 562a and 562b. In the embodiment shown in FIG. 4, the light emitted from LED lighting system 552 passes through secondary optics 554, and the light emitted from the LED lighting system 556 passes through secondary optics 558. In alternative embodiments, the light beams 561 and 562 do not pass through any secondary optics. The secondary optics may be or may include one or more light guides. The one or more light guides may be edge lit or may have an interior opening that defines an interior edge of the light guide. LED lighting systems 552 and/or 556 may be inserted in the interior openings of the one or more light guides such that they inject light into the interior edge (interior opening light guide) or exterior edge (edge lit light guide) of the one or more light guides. LEDs in LED lighting systems 552 and/or 556 may be arranged around the circumference of a base that is part of the light guide. According to an implementation, the base may be thermally conductive. According to an implementation, the base may be coupled to a heat-dissipating element that is disposed over the light guide. The heat-dissipating element may be arranged to receive heat generated by the LEDs via the thermally conductive base and dissipate the received heat. The one or more light guides may allow light emitted by LED lighting systems 552 and 556 to be shaped in a desired manner such as, for example, with a gradient, a chamfered distribution, a narrow distribution, a wide distribution, an angular distribution, or the like.

In example embodiments, the system 550 may be a mobile phone of a camera flash system, indoor residential or commercial lighting, outdoor light such as street lighting, an automobile, a medical device, AR/VR devices, and robotic devices. The integrated LED lighting system 400A shown in FIG. 3A, the integrated LED lighting system 400B shown in FIG. 3B, the LED lighting system 400C shown in FIG. 3C, and the LED lighting system 400D shown in FIG. 3D illustrate LED lighting systems 552 and 556 in example embodiments.

In example embodiments, the system 550 may be a mobile phone of a camera flash system, indoor residential or commercial lighting, outdoor light such as street lighting, an automobile, a medical device. AR/VR devices, and robotic devices. The integrated LED lighting system 400A shown in FIG. 3A, the integrated LED lighting system 400B shown in FIG. 3B, the LED lighting system 4000 shown in FIG. 30, and the LED lighting system 400D shown in FIG. 3D illustrate LED lighting systems 552 and 556 in example embodiments.

The application platform 560 may provide power to the LED lighting systems 552 and/or 556 via a power bus via line 565 or other applicable input, as discussed herein. Further, application platform 560 may provide input signals via line 565 for the operation of the LED lighting system 552 and LED lighting system 556, which input may be based on a user input/preference, a sensed reading, a pre-programmed or autonomously determined output, or the like. One or more sensors may be internal or external to the housing of the application platform 560.

In various embodiments, application platform 560 sensors and/or LED lighting system 552 and/or 556 sensors may collect data such as visual data (e.g., LIDAR data, IR data, data collected via a camera, etc.), audio data, distance based data, movement data, environmental data, or the like or a combination thereof. The data may be related a physical item or entity such as an object, an individual, a vehicle, etc. For example, sensing equipment may collect object proximity data for an ADAS/AV based application, which may prioritize the detection and subsequent action based on the detection of a physical item or entity. The data may be collected based on emitting an optical signal by, for example, LED lighting system 552 and/or 556, such as an IR signal and collecting data based on the emitted optical signal. The data may be collected by a different component than the component that emits the optical signal for the data collection. Continuing the example, sensing equipment may be located on an automobile and may emit a beam using a vertical-cavity surface-emitting laser (VCSEL). The one or more sensors may sense a response to the emitted beam or any other applicable input.

In example embodiment, application platform 560 may represent an automobile and LED lighting system 552 and LED lighting system 556 may represent automobile headlights. In various embodiments, the system 550 may represent an automobile with steerable light beams where LEDs may be selectively activated to provide steerable light. For example, an array of LEDs may be used to define or project a shape or pattern or illuminate only selected sections of a roadway. In an example embodiment. Infrared cameras or detector pixels within LED lighting systems 552 and/or 556 may be sensors that identify portions of a scene (roadway, pedestrian crossing, etc.) that require illumination.

Figure 5A:
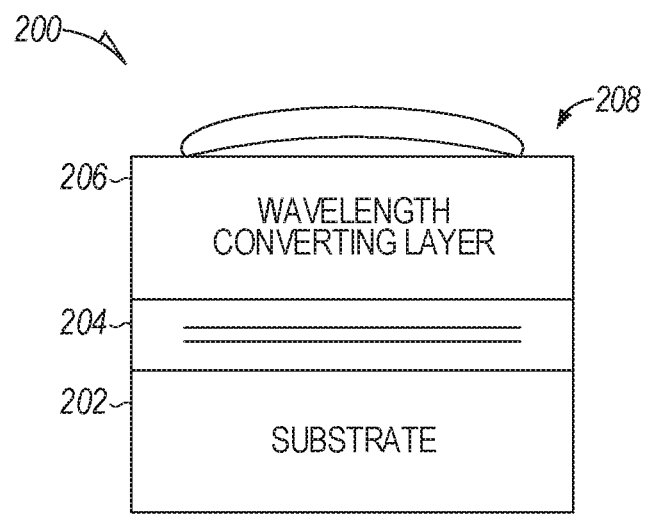
FIG. 5A is a diagram showing an LED device.

FIG. 5A is a diagram of an LED device 200 in an example embodiment. The LED device 200 may include a substrate 202, an active layer 204, a wavelength converting layer 206, and primary optic 208. In other embodiments, an LED device may not include a wavelength converter layer and/or primary optics. Individual LED devices 200 may be included in an LED array in an LED lighting system, such as any of the LED lighting systems described above.

As shown in FIG. 5A, the active layer 204 may be adjacent to the substrate 202 and emits light when excited. Suitable materials used to form the substrate 202 and the active layer 204 include sapphire, SiC, GaN, Silicone and may more specifically be formed from a III-V semiconductors including, but not limited to, AlN, AlP, AlAs, AlSb, GaN, GaP, GaAs, GaSb, InN, InP, InAs, InSb, II-VI semiconductors including, but not limited to, ZnS, ZnSe, CdSe, CdTe, group IV semiconductors including, but not limited to Ge, Si, SiC, and mixtures or alloys thereof.

The wavelength converting layer 206 may be remote from, proximal to, or directly above active layer 204. The active layer 204 emits light into the wavelength converting layer 206. The wavelength converting layer 206 acts to further modify wavelength of the emitted light by the active layer 204, LED devices that include a wavelength converting layer are often referred to as phosphor converted LEDs ("PCLED"). The wavelength converting layer 206 may include any luminescent material, such as, for example, phosphor particles in a transparent or translucent binder or matrix, or a ceramic phosphor element, which absorbs light of one wavelength and emits light of a different wavelength.

Figure 5B:
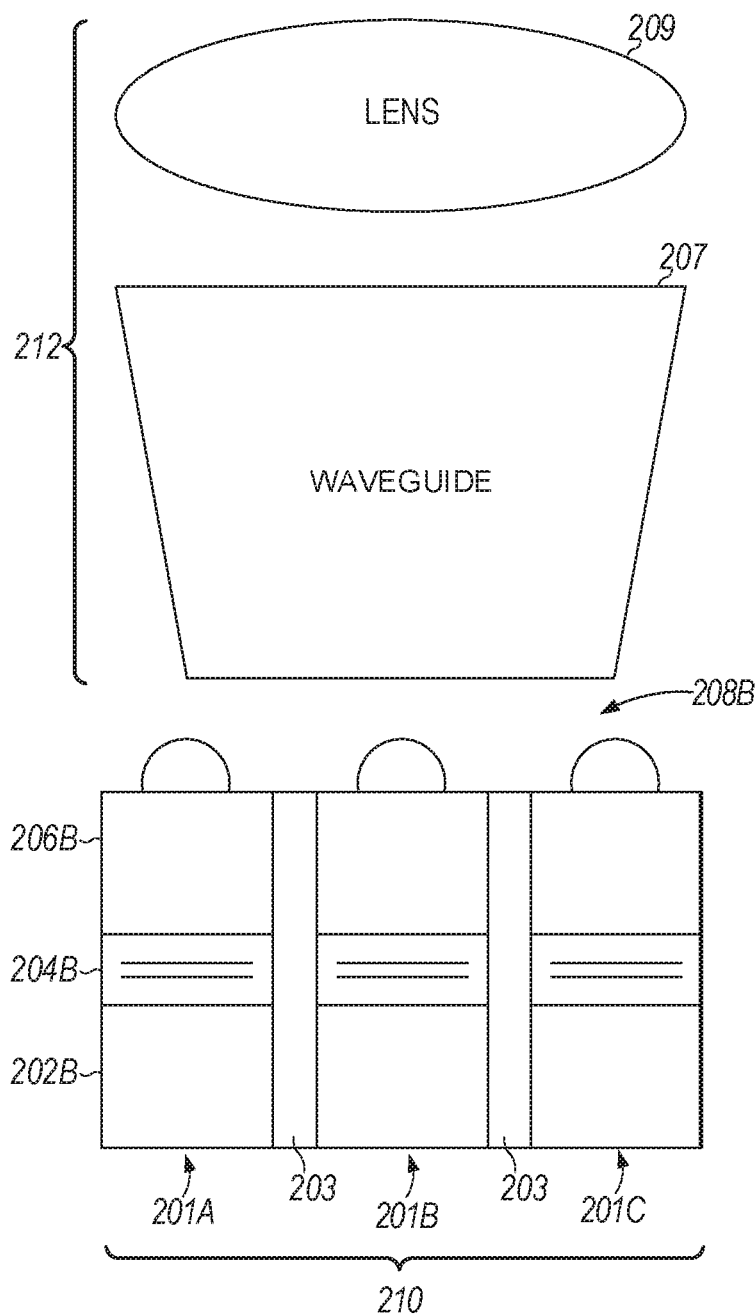
FIG. 5B is a diagram showing multiple LED devices.

The primary optic 208 may be on or over one or more layers of the LED device 200 and allow light to pass from the active layer 204 and/or the wavelength converting layer 206 through the primary optic 208. The primary optic 208 may be a lens or encapsulate configured to protect the one or more layers and to, at least in part, shape the output of the LED device 200. Primary optic 208 may include transparent and/or semi-transparent material. In example embodiments, light via the primary optic may be emitted based on a Lambertian distribution pattern. It will be understood that one or more properties of the primary optic 208 may be modified to produce a light distribution pattern that is different than the Lambertian distribution pattern, FIG. 5B shows a cross-sectional view of a lighting system 220 including an LED array 210 with pixels 201A, 201B, and 201C, as well as secondary optics 212 in an example embodiment. The LED array 210 includes pixels 201A, 201B, and 201C each including a respective wavelength converting layer 206B active layer 204B and a substrate 202B. The LED array 210 may be a monolithic LED array manufactured using wafer level processing techniques, a micro LED with sub-500 micron dimensions, or the like. Pixels 201A, 201B, and 201C, in the LED array 210 may be formed using array segmentation, or alternatively using pick and place techniques.

The spaces 203 shown between one or more pixels 201A, 201B, and 201C of the LED devices 200B may include an air gap or may be filled by a material such as a metal material which may be a contact (e.g., n-contact).

The secondary optics 212 may include one or both of the lens 209 and waveguide 207. It will be understood that although secondary optics are discussed in accordance with the example shown, in example embodiments, the secondary optics 212 may be used to spread the incoming light (diverging optics), or to gather incoming light into a collimated beam (collimating optics). In example embodiments, the waveguide 207 may be a concentrator and may have any applicable shape to concentrate light such as a parabolic shape, cone shape, beveled shape, or the like. The waveguide 207 may be coated with a dielectric material, a metallization layer, or the like used to reflect or redirect incident light. In alternative embodiments, a lighting system may not include one or more of the following: the converting layer 206B, the primary optics 208B, the waveguide 207 and the lens 209.

Lens 209 may be formed form any applicable transparent material such as, but not limited to SiC, aluminum oxide, diamond, or the like or a combination thereof. Lens 209 may be used to modify the a beam of light input into the lens 209 such that an output beam from the lens 209 will efficiently meet a desired photometric specification. Additionally, lens 209 may serve one or more aesthetic purpose, such as by determining a lit and/or unlit appearance of the LED devices 201A, 201B and/or 201C of the LED array 210.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A light-emitting diode (LED) color tuning apparatus, comprising:
a hybrid driving-circuit to be coupled to a multi-colored LED array, the hybrid driving-circuit including:
an analog current-division circuit to produce current for at least two LED current-driving sources; and
a switching array coupled between the analog current-division circuit and the multi-colored LED array, the switching array being configured to provide periodically, for a predetermined amount of time, current from at least one of the at least two LED current-driving sources to at least two colors of the multi-colored LED array substantially simultaneously.

2. The LED color tuning apparatus of claim 1, further comprising an LED driver electrically coupled to a voltage regulator, the voltage regulator to provide a voltage signal for the multi-colored LED array, a combination of the LED driver and the voltage regulator to provide a stabilized current as an input to the analog current-division circuit.

3. The LED color tuning apparatus of claim 1, wherein the switching array comprises a multiplexer array.

4. The LED color tuning apparatus of claim 1, further comprising a voltage-controlled current source configured to supply current to the analog current-division circuit to produce the current for the at least two LED current-driving sources.

5. The LED color tuning apparatus of claim 1, wherein the switching array is configured to:
provide a first current from a first of the at least two LED current-driving sources to a first of three colors in the multi-colored LED array and a second current from a second of the at least two LED current-driving sources to a second of three colors in the multi-colored LED array substantially simultaneously during a first portion of a time period,
provide the first current to the second of three colors in the multi-colored LED array and the second current to a third of three colors of in the multi-colored LED array substantially simultaneously during a second portion of the time period, and
provide the first current to the first of three colors in the multi-colored LED array and the second current to the third of three colors in the in the multi-colored LED array substantially simultaneously during a third portion of the time period.

6. The LED color tuning apparatus of claim 5, wherein the first portion, the second portion, and the third portion of the time period are selectable using pulse width modulation (PWM) time slicing.

7. The LED color tuning apparatus of claim 5, wherein the first current and the second current sum to substantially be equal an input current supplied to the analog current-division circuit from an LED driver.

8. The LED color tuning apparatus of claim 5, wherein each of the at least two LED current-driving sources are configured to supply substantially equal amounts of current to the multi-colored LED array.

9. The LED color tuning apparatus of claim 5, wherein each of the at least two LED current-driving sources are configured to supply unequal amounts of current to the multi-colored LED array.

10. The LED color tuning apparatus of claim 1, wherein the multi-colored LED array comprises at least one red-colored LED, at least one green-colored LED, and at least one blue-colored LED.

11. The LED color tuning apparatus of claim 1, wherein the multi-colored LED array comprises at least one desaturated red LED, at least one desaturated green LED, and at least one desaturated blue LED.

12. The LED color tuning apparatus of claim 1, wherein the switching array comprises at least four switching devices.

13. The LED color tuning apparatus of claim 1, wherein the hybrid driving-circuit is further configured to supply a pulse-width modulation (PWM) time slicing signal to selected ones of the multi-colored LED array.

14. A light-emitting diode (LED) color tuning apparatus, comprising:
a multi-colored LED array comprising at least one desaturated red LED, at least one desaturated green LED, and at least one desaturated blue LED; and
a hybrid driving-circuit coupled to the multi-colored LED array, the hybrid driving-circuit including:
an analog current-division circuit to produce current for at least two LED current-driving sources; and
a switching array coupled between the analog current-division circuit and the multi-colored LED array, the switching array being configured to provide periodically, for a predetermined amount of time, current from at least one of the at least two LED current-driving sources to at least two colors of the multi-colored LED array substantially simultaneously.

15. The LED color tuning apparatus of claim 14, further comprising a voltage-controlled current source configured to supply current to the analog current-division circuit to produce the current for the at least two LED current-driving sources.

16. The LED color tuning apparatus of claim 15, further comprising a computational device configured to compare a first sensed-voltage, $V_{SENSE1}$, and a second sensed-voltage, $V_{SENSE2}$, to determine and supply a set voltage, $V_{SET}$, the set voltage being an input voltage for the voltage-controlled current source.

17. The LED color tuning apparatus of claim 14, wherein the hybrid driving-circuit is further configured to supply a pulse-width modulation (PWM) time slicing signal to selected ones of the multi-colored LED array.

18. The LED color tuning apparatus of claim 14, further comprising an LED driver electrically coupled to a voltage regulator, the voltage regulator to provide a voltage signal for the multi-colored LED array, a combination of the LED driver and the voltage regulator to provide a stabilized current as an input to the analog current-division circuit.

19. A method for tuning a multi-colored, light-emitting diode (LED) array, the method comprising:
determining and supplying a set voltage as an input voltage for a voltage-controlled current source;
dividing an input current into a first current and a second current; and
based on a determination of a color temperature:
providing the first current to a first of three colors of the multi-colored LED array and providing the second current to a second of three colors of the multi-colored LED array substantially simultaneously during a first portion of a time period;
providing the first current to the second of three colors of the multi-colored LED array and providing the second current to a third of three colors of the multi-colored LED array substantially simultaneously during a second portion of the time period; and
providing the first current to the first of three colors of the multi-colored LED array and providing the second current to the third of three colors of the LED multi-colored array substantially simultaneously during a third portion of the period.

20. The method for tuning a multi-colored, LED array of claim 19, wherein the providing of the first current and the providing of the second current to different duplets of the LED multi-colored array occurs using pulse-width modulation (PWM) time slicing.

* * * * *